United States Patent
Gokturk et al.

(10) Patent No.: US 9,479,938 B2
(45) Date of Patent: Oct. 25, 2016

(54) INTERFACE AWARE CHANNEL SELECTION SCHEMES

(71) Applicant: AIRTIES KABLOSUZ ILETISIM SAN. VE DIS TIC. A.S., Istanbul (TR)

(72) Inventors: Muharrem Sarper Gokturk, Istanbul (TR); Gulden Ferazoglu, Istanbul (TR); Metin Ismail Taskin, Istanbul (TR)

(73) Assignee: Airties Kablosuz Iletisim San. Ve Dis Tic. A.S., Istanbul (TR)

( * ) Notice: Subject to any disclaimer, the term of this patent is extended or adjusted under 35 U.S.C. 154(b) by 60 days.

(21) Appl. No.: 14/186,690

(22) Filed: Feb. 21, 2014

(65) Prior Publication Data
US 2015/0003404 A1    Jan. 1, 2015

Related U.S. Application Data

(60) Provisional application No. 61/841,478, filed on Jul. 1, 2013.

(51) Int. Cl.
*H04W 16/10* (2009.01)
*H04W 72/08* (2009.01)
*H04W 72/04* (2009.01)

(52) U.S. Cl.
CPC ......... *H04W 16/10* (2013.01); *H04W 72/0446* (2013.01); *H04W 72/0453* (2013.01); *H04W 72/082* (2013.01)

(58) Field of Classification Search
None
See application file for complete search history.

(56) References Cited

U.S. PATENT DOCUMENTS

| 2003/0040319 | A1* | 2/2003 | Hansen et al. ............... 455/452 |
| 2005/0003865 | A1* | 1/2005 | Lastinger et al. ......... 455/562.1 |
| 2009/0270025 | A1* | 10/2009 | Kossi et al. ................ 455/3.01 |
| 2010/0022262 | A1* | 1/2010 | Aue ..................... H04W 16/14 455/501 |
| 2011/0128920 | A1* | 6/2011 | Lee et al. ...................... 370/329 |
| 2011/0164527 | A1 | 7/2011 | Mishra et al. |
| 2012/0195220 | A1* | 8/2012 | Kurt et al. .................... 370/252 |
| 2013/0136117 | A1 | 5/2013 | Schrum, Jr. et al. |
| 2013/0194944 | A1* | 8/2013 | Soyak et al. ................. 370/252 |
| 2013/0235906 | A1* | 9/2013 | Kim ......................... H03L 7/00 375/144 |

OTHER PUBLICATIONS

"IEEE Standard for a Convergent Digital Home Network for Heterogeneous Technologies; IEEE Std. 1905.1-2013", IEEE Standard, IEEE Piscataway, NJ, USA, Apr. 12, 2013, pp. 1-93, XP068050268, ISBN: 978-0-7381-8297-1.
"AirTies Points Way to HD Video on Hybrid Wi-Fi/Powerline Networks", http://www.onlinereporter.com/2011/07/13/airties-points-way-to-hd-video-on-hybrid-wi-fipowerline-networks/, The Online Reporter, Jul. 13, 2011.

(Continued)

*Primary Examiner* — Ian N Moore
*Assistant Examiner* — Justin T Van Roie
(74) *Attorney, Agent, or Firm* — Harness, Dickey & Pierce, P.L.C.

(57) ABSTRACT

An access point is configured to determine a frequency channel to operate on. The access point includes a storage element having machine executable code therein that, when executed by a processor, cause the processor to determine the frequency channel with a highest data throughput among available frequency channels, which may undergo different levels of interference.

15 Claims, 9 Drawing Sheets

(56) References Cited

OTHER PUBLICATIONS

"IEEE Standard for a Convergent Digital Home Network for Heterogeneous Technologies; IEEE Std. 1905.1-2013", IEEE Standard, IEEE Piscataway, NJ, USA, Apr. 12, 2013, pp. 1-93, XP066050268, ISBN: 978-0-7381-8297-1.

European Search Report dated Jan. 5, 2015 for Application No. EP 14 16 7788.

* cited by examiner

INTERFACE AWARE CHANNEL SELECTION SCHEMES

PRIORITY INFORMATION

This application claims priority from U.S. Provisional Application No. 61/841,478 filed on Jul. 1, 2013, the entire contents of which are incorporated herein by reference.

BACKGROUND

Signals from radio access devices that operate on Institute of Electrical and Electronics Engineers (IEEE) 802.11, IEEE 802.15.4, Bluetooth technology or other comparable standards, generate some amount of energy outside of their approved spectrum band, which may be referred to as side band emissions.

Although devices that transmit/receive such signals employ filtering to minimize RF interference from adjacent channels, this interference also generates side lobe energy that falls into the pass band of signals that operate on IEEE 802.11, IEEE 802.15.4, Bluetooth technology or other comparable standards. If the adjacent channel interference (ACI) is much stronger than the 802.11 signal, side band energy from the ACI may dominate the channel's noise floor (NF) (e.g., increase the effective NF of the frequency channel).

The high level of ACI results in a NF that dominates the 802.11 channel's Signal to Interference and Noise Ratio (SINR), which in turn reduces WLAN signal strength by causing, for example, processing artifacts and quantization errors. Increased noise floor due to adjacent channel interference decreases the receive sensitivity of a device yielding unacceptably low throughput, and sometimes, even no throughput at all. Furthermore, in case of high ACI, the device will not be able to take any share of the airtime, e.g., it will not have access to the medium, since the interfering signals numb the Device's receiver (e.g., render the device's receiver inoperable with respect to receiving and filtering signals).

FIG. 1 illustrates the effect of adjacent interfering channel on a receiving channel's noise floor. As illustrated in FIG. 1, the energy emission from the adjacent channel increases the NF of the receive channel from the Noise Floor (dashed line) to the Effective Noise Floor (solid line), thus resulting in a lower SINR 2, as opposed to the SINR 1, if no interference was received at the receive channel from the adjacent channel.

IEEE specifies the required minimum spectral mask for the transmitted signals. However, even though transmitted signals satisfy the spectral mask requirements, the transmitters may still emit unwanted signals at image frequencies, which also constitute a source of interference for other nodes in the vicinity of a receiver at a given node. In order to suppress unwanted signals, each device applies adjacent channel rejection (ACR) at its receiver. ACR performance is inherently related to RF hardware design, such as the design of sideband and image filters. For example, two Access Point devices (APs), both satisfying the IEEE criterion on spectral requirements, in close vicinity of each other, may numb one another's receiver if the frequencies they operate at, cause high adjacent channel interference to one another. This effect may be one sided, meaning that one AP numbs the receiver of the other AP, yielding the numbed AP to stop all communications, while the other AP takes full share of the medium, i.e., airtime.

SUMMARY

At least one example embodiment relates to an access point configured to determine a frequency channel to operate on.

In at least one embodiment, the access point includes a storage element having machine executable code therein that, when executed by a processor, cause the processor to determine the frequency channel with a highest data throughput among available frequency channels.

In at least one embodiment, the machine executable code, when executed by the processor, causes the processor to, scan the available frequency channels for at least an interference level of each of the available frequency channels, the interference level indicating a level of interference by an interfering signal at a corresponding one of the available frequency channels and create a table based on at least the interference level at each of the available frequency channels, the frequency channel being determined based on at least the created table.

In at least one embodiment, the machine executable code, when executed by the processor, causes the processor to determine a noise floor of each of the available channels based on the created table and another table indicating a tolerable interference level at each of the available channels, the frequency channel being determined based on at least the created table and the determined noise floor of each of the available channels.

In at least one embodiment, the machine executable code, when executed by the processor, causes the processor to determine whether at least one client is connected to the access point, the client being a device communicating with the access point.

In at least one embodiment, if the machine executable code, when executed by the processor, causes the processor to determine that no client is connected to the access point, the machine executable code, when executed by the processor, causes the processor to determine the frequency channel by selecting one of the available channels with the lowest determined noise floor among the available frequency channels.

In at least one embodiment, if the machine executable code, when executed by the processor, causes the processor to determine that at least one client is connected to the access point, then the machine executable code, when executed by the processor, causes the processor to determine a signal strength of a signal received from the at least one client at the access point.

In at least one embodiment, the machine executable code, when executed by the processor, causes the processor to determine the frequency channel by determining a data throughput at each of the available channels when the access point communicates with the at least one client over each of the available channels based on the determined signal strength of the signal received at the access point and a set of system parameters. The machine executable code, when executed by the processor, further causes the processor to determine the frequency channel by selecting one of the available frequency channels at which a minimum data throughput when the access point communicates with the at least one client is maximized among the available frequency channels, the minimum data throughput being a data throughput when the access point communicates with the at least one client having the lowest signal to interference and noise ratio (SINR), the selected one of the available frequency channels being the frequency channel with the highest data throughput.

In at least one embodiment, the set of system parameters include each channel's guard interval, each channel's frequency bandwidth and a number of antennas of the access point and the at least one client.

In at least one embodiment, the machine executable code, when executed by the processor, causes the processor to determine an available airtime for each of the available frequency channels, the available airtime indicating an amount of time when a corresponding one of the available frequency channels is idle, and update the table by including the determined available airtime of each of the available frequency channels in the table.

In at least one embodiment, the machine executable code, when executed by the processor, causes the processor to determine a noise floor of each of the available channels based on the updated table and another table indicating a tolerable interference level at each of the available channels, the frequency channel being determined based on at least the created table and the determined noise floor of each of the available channels.

In at least one embodiment, the machine executable code, when executed by the processor, causes the processor to determine whether at least one client is connected to the access point, the client being a device communicating with the access point.

In at least one embodiment, if the machine executable code, when executed by the processor, causes the processor to determine that at least one client is connected to the access point, then the machine executable code, when executed by the processor, causes the processor to determine a signal strength of a signal received from the client at the access point.

In at least one embodiment, the machine executable code, when executed by the processor, causes the processor to determine the frequency channel by determining a data throughput at each of the available channels when the access point communicates with the at least one client over each of the available channels based on the available airtime of each of the available frequency channels, the determined signal strength of the signal received at the access point and a set of system parameters. The machine executable code, when executed by the processor, further causes the processor to determine the frequency channel by selecting one of the available frequency channels at which a minimum data throughput when the access point communicates with the at least one client is maximized among the available frequency channels, the minimum data throughput being a data throughput when the access point communicates with the at least one client having the lowest signal to interference and noise ratio (SINR), the selected one of the available frequency channels being the frequency channel with the highest data throughput.

In at least one embodiment, the set of system parameters include each channel's guard interval, each channel's frequency bandwidth and a number of antennas of the access point and the at least one client.

In at least one embodiment, the machine executable code, when executed by the processor, causes the processor to determine whether the access point is a mesh node.

In at least one embodiment, upon the machine executable code, when executed by the processor, causes the processor to determine that the access node is a mesh node, the machine executable code, when executed by the processor, causes the processor to exchange the table with other mesh nodes and synchronize the tables among the mesh nodes.

In at least one embodiment, the access point is a router.

In at least one embodiment, the router is based on at least one of IEEE 802.11, IEEE 802.15.4 and Bluetooth technology standard.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments.

DETAILED DESCRIPTION

Figure 1:
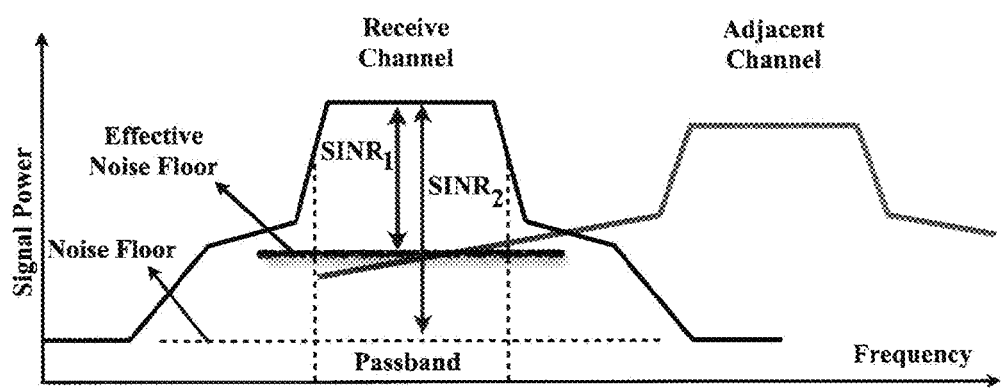
FIG. 1 illustrates the effect of adjacent interfering channel on a receiving channel's noise floor.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. However, example embodiments are not limited to these given implementations.

As used herein, the term "user equipment" (UE) may be considered synonymous to, and may hereafter be occasionally referred to, as a phone, wirelessly equipped laptop, a mobile, mobile unit, mobile user, subscriber, user, remote station, access terminal, tablet, receiver, smart television, etc., and may describe a remote user of wired or wireless resources in a network. The term "Access Point" (AP) may be considered synonymous to and/or referred to as a wired and/or wireless router, hub, switch, a public gateway, a public/private gateway, and/or other source of audio and/or data transmission usable by various UEs and may describe equipment that provides data and/or audio connectivity between the network and one or more UEs.

Figure 2:
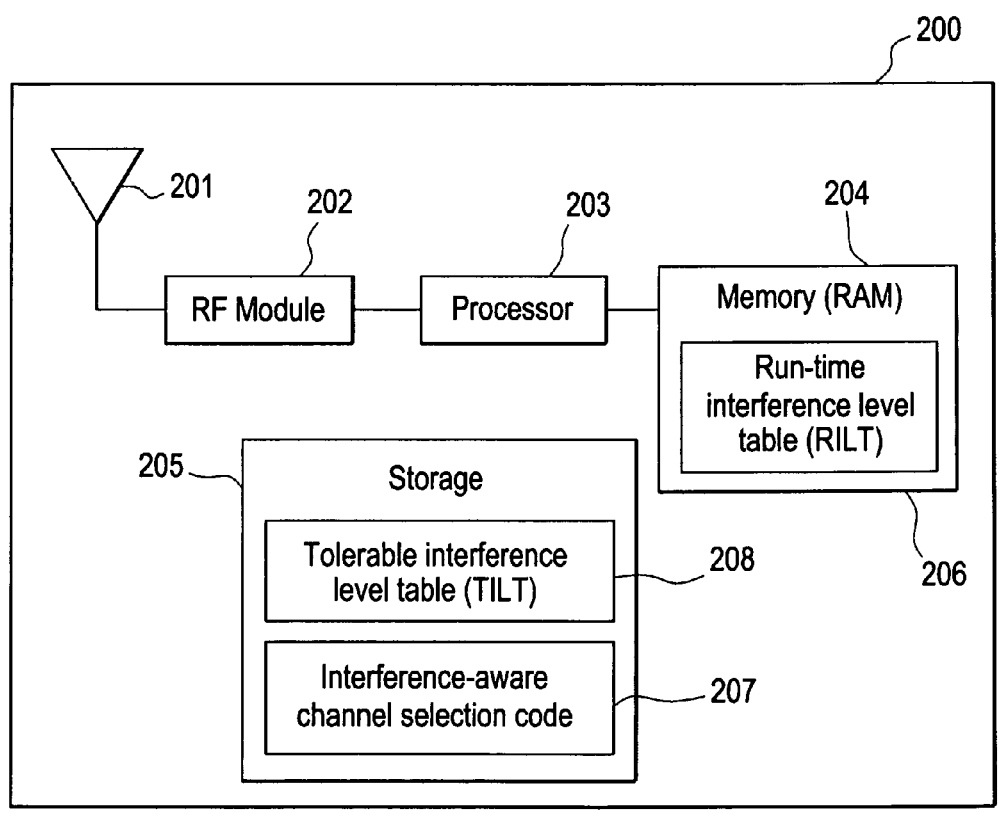
FIG. 2 illustrates a block diagram of an access point, according to an example embodiment.

FIG. 2 illustrates a block diagram of an access point, according to an example embodiment.

Referring to FIG. 2, an access point (AP) 200, which may refer to any of the devices, described above, includes an antenna 201, a radio frequency (RF) module 202, a processor 203, a memory 204 and a storage element 205. The RF module 202 may be an electronic circuit capable of receiving/transmitting signals at one or more carrier frequencies (CF). The processor 203 executes computer code stored in the storage element 205 that, when executed, autonomously configures the AP 200 to select an operating frequency with the least amount of interference for establishing communication with user equipment (UEs) and/or other elements present within the AP 200's communication network. The memory 204 may be a read access memory and may have data stored thereon, such as Run-time Interference Level Table (RILT) 206, which will be further described below. The storage element 205 has stored thereon a code for selecting a carrier frequency with the least amount of interference from adjacent channels, for the AP 200 to operate on. The code may be referred to as Interference-aware channel selection code 207. The Interference-aware channel selection code, as described above, is executed by the processor 203. The storage element 205 also has stored thereon, a Tolerable Interference Level Table (TILT) 208, which will be further described below.

Hereinafter, a process carried out by the AP 200 for determining a carrier frequency to operate on will be described with respect to FIG. 3. The process may also be referred to as Interference Aware Channel Selection (IACS) process.

Figure 3:
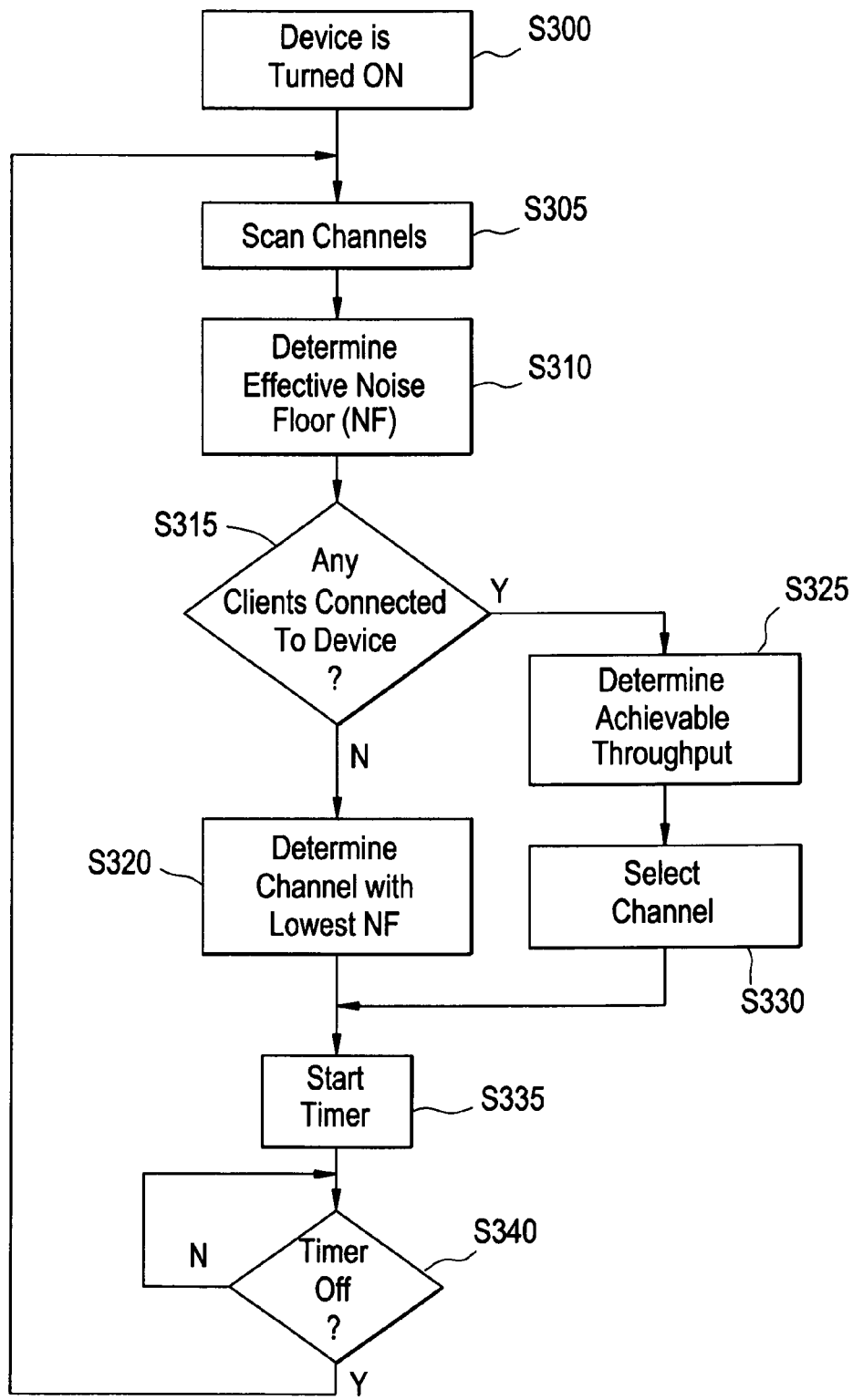
FIG. 3 illustrates a flow chart for performing an Interference Aware Channel Selection process, according to an example embodiment.

FIG. 3 illustrates a flow chart for performing an Interference Aware Channel Selection process, according to an example embodiment. At operation S300, the AP 200 is turned on. The AP 200 is turned on, for example, in response to receiving a request signal from a client (e.g., a receiver, a UE, etc.) for data.

In operation S305, the AP 200 scans available channels at a given frequency (e.g., channels at 2.4 GHz band, channels at 5 GHz band, etc.). The AP 200 scans the channels to obtain two types of information. The first type of information relates to a number of other APs present/operating on each available frequency channel that is scanned and an interference level (IL) experienced by the AP 200 from other available APs at each of the scanned channels. The second type of information is the available airtime at each channel that is scanned.

In order to obtain the first type of information on the number of other APs and a signal strength of each AP in the vicinity of AP 200, the AP 200, in at least one example embodiment, actively scans a given frequency band in which AP 200 operates (e.g., 2.4 GHz band, 5 GHz band, etc.). The AP 200 actively scans the given frequency band via, for example, probe request frames. Using the probe request frames, the AP 200 sends probe request frames at each channel and sorts the probe response frames from the other APs in the vicinity. The AP 200 further determines the signal strength with which the probe response frames are received (e.g., the power level of the signal via which each probe response frame from any other AP is received at the AP 200).

However, additional/alternative methods may be used to scan the given frequency band. In at least one example embodiment, the AP 200 utilizes passive scanning, in which the AP passively listens to the transmissions of the other devices in each channel, and obtains information about the neighboring nodes through, for example, beacon frames, etc.

In order to obtain the second type of information on the available airtime, at each channel scanned by the AP 200, in at least one example embodiment, the AP 200 passively listens to each channel for a period of time (e.g., 100 ms). Such passive listening may be referred to as Clear Channel Assessment (CCA). During such passive listening, the AP 200 measures the amount of time that the channel is idle (e.g., not in use by the AP 200 or any other device). For example, the AP 200 may determine that in a given 100 ms time period, the given scanned channel is idle for 20 ms. Therefore, the available airtime based on such measurement is 20%. However, since one CCA measurement may not provide an accurate measurement of the available airtime, the AP 200 may repeat the CCA measurement multiple times and set the available airtime as an average of the CCA measurements. For example, the AP 200 may perform 5 CCA measurements and set the available airtime of the scanned channel as the average of the 5 CCA measurements.

The AA information may or may not be available. In at least one example embodiment, when the AA information is not available, the method based on which the AP 200 selects a frequency channel to operate on, may be referred to as the IACS without AA, which will be further described below.

In at least one example embodiment, the AP 200 obtains the second type of information by executing a code, stored in the storage element 205, which when executed, implements Algorithm 1, as shown below. As shown in Algorithm I, in at least one example embodiment, the AP 300 repeats the measurement of AA until such measurement converges to an estimation that satisfies a minimum standard deviation among the CCA messages. The minimum standard deviation may be a matter of design choice and thus is determined based on empirical studies. The minimum standard deviation represents a confidence value in the accuracy of the measured AA. If a reliable AA estimation cannot be obtained with a specific number of measurements (e.g. $A_{min}$, as shown in Algorithm I), the AA is set as the minimum of the measured AAs (e.g., the least available AA).

Algorithm I
Algorithm 1: Estimated Available Airtime, $\tau(c)$

C : List of channels in the channel plan;
C : Number of channels in the channel plan, C = |C|;
/*$\tau(c)$ denotes the estimated available airtime for channel c*/
/* $\bar{\tau}(c)$ denotes the average available airtime over sample CCA measurements for channel c*/
/*$\sigma(c)$ denotes the standard deviation of available airtime measurements for channel c*/
/* $A_{min}$ denotes the required minimum number of CCA samples*/
/* $A_{max}$ denotes the maximum allowable number of CCA samples*/
/*$\sigma_0$ denotes the required minimum standard deviation*/
/* F(c) is a flag denoting that airtime scan is complete for channel c*/
for j ← 1 to $A_{max}$ do
    for c ← 1 to C do
        if !F(c) then
            a(c,j) ← Get a CCA measurement for channel c;
            $\bar{a}(c) = 1/j \; \Sigma_{k=0}^{j} \; a(k)$;
            $\sigma^2(c) = 1/j \; \Sigma_{k=0}^{j} \; (a(c,k) - \bar{a}(c))^2$;
            if $\sigma(c) < \sigma_0$ and $A_{min} < j$ then
                $\tau(c) \leftarrow \bar{a}(c)$;
                F(c) = True;
            if $\sigma(c) > \sigma_0$ and $A_{max} < j$ then
                $\tau(c) \leftarrow \min_{k-1, \ldots, j} a(c, k)$;
                F(c) = True;

In at least one example embodiment, the AP 200 may determine the maximum of the measured AAs for each channel as the AA for that channel. In at least one example embodiment, the AP 200 may determine the minimum of the measured AAs for each channel as the AA for that channel. In at least one example embodiment, the constraint on the minimum standard deviation is relaxed such that the measured AAs for each channel converges to the estimation more rapidly.

Based on the first type of information and the second type of information, the AP 200 creates Table I shown below. Table I is the RILT, mentioned above. As can be seen from Table I, RILT includes several channel numbers. Depending on the frequency band in which the AP 200 operates, the number of channels may be different. For example, the 5 GHz band has more channels than the 2.4 GHz band. The example embodiment shown in Table I illustrates channels with 40 MHz bandwidth, namely, 36, 44, 52 . . . 132, in the 5 GHz band. A scan carried out in a specific channel provides information, such as available airtime and received interference level information, for all the channel numbers within the occupied bandwidth. For example, channels 38, 40 and 42 are available between the $36^{th}$ and the $44^{th}$ channels however, assuming a 40 MHz bandwidth for each channels, $40^{th}$ and $42^{nd}$ channels have bandwidths that overlap with the $36^{th}$ and the $44^{th}$ channels.

While selecting channels with non-overlapping frequency bandwidths are preferable, in at least one example embodiment, channels with overlapping frequencies are scanned by the AP 200. In one example embodiment and in reference to the determination of the AA for each channel, if the AP 200 is unable to obtain a convergence of the measured AAs to the set estimation in a given period of time (e.g., one millisecond, one second, etc.), then the AP 200 will scan overlapping channels. For example, after scanning channel 36 and determine a first AA for channel 36, if the AP 200 is unable to find a convergence of the measured AAs for the non-overlapping channel 44, within a given period of time, then the AP 200 scans the overlapping channel 40 instead.

At each scanned channel, Table I illustrates an interference level. In at least one example embodiment, when the AP 200 actively scans each channel, the AP 200 detects one or more other APs. If the AP 200 detects more than one other AP, then the AP 200 selects one of the other APs with the strongest interference level (IL) to be included in table I. For example, if at channel 36, the AP 200 detects three other APs with ILs of −55 dBm, −67 dBm and −70 dBm, the AP 200 selects the AP with the −55 dBm IL to be included in Table I for channel 36.

Table I also includes an available airtime (AA) if information on the AA are available. The AA is expressed in terms of percentages, for each channel, which the AP 200 determines, as described above. While the Table I is initially created when the AP 200 is turned on, in at least one example embodiment, the AP 200 periodically updates the Table I at, for example, times when there is no traffic on the AP 200. The periodicity of updating the Table I may be for example, every 30 minutes. The periodicity with which Table I is updated will be further described with reference to FIG. 3.

TABLE I

| | \multicolumn{9}{c}{Channel} | | | | | | | | |
|---|---|---|---|---|---|---|---|---|---|
| | 36 | 44 | 52 | 60 | 100 | 108 | 116 | 124 | 132 |
| Interference Level (dBm) | −55 | −65 | −75 | −90 | −75 | −65 | −55 | −90 | −90 |
| AA (%) | 20 | 50 | 50 | 100 | 100 | 20 | 50 | 100 | 100 |

Depending on standards set by the industry, which may be different in different countries (e.g., Europe v. the United States), in a given frequency band, certain channels may be used to transmit radar signals by radar systems. Radar signals may refer to signals transmitted by law enforcement units (e.g., police), signals transmitted by air control units at airports, etc. As an example, the 5 GHz frequency band is utilized for transmission of radar signals, where channels such as channels 108, 116, 124, 132, etc., can be used for radar transmission as well as transmission by AP devices.

In at least one example embodiment, in determining the example RILT table discussed above, the AP 200 also determines if each of the channels it listens also have radar signal(s) transmitted thereon. The AP 200 determines the existence of such radar signal(s) according to, for example, the method described in the U.S. application Ser. No. 13/558,170, incorporated herein by reference in its entirety.

If the AP 200 determines that any of the channels monitored/listened to by the AP 200 have radar signals transmitted thereon, then the AP 200 eliminates such channels from the RILT table. For example, at the boot up or during any updating of the RILT table, if the AP 200 determines that channel 132 is used by a radar system to transmit radar signals, then the AP 200 excludes the channel 132 from the created/updated RILT table.

In operation S310, using the RILT, an example embodiment of which is described above and a TILT, which will be described below, the AP 200 determines the effective NF for each available/scanned channel, for example, for each of the channels 36, 44, 52 . . . 132, shown in Table I. The TILT is described below.

The AP 200 competes with other APs in its vicinity for utilizing the same channel. However, if the neighboring APs are operating on a different frequency channel (e.g., adjacent channels), signals received from the neighboring APs appear as ACI signals to the AP 200, causing the effective NF of the channel at which the AP 200 operates to increase. Depending on how close the neighboring APs are to the AP 200 and/or how strong the power of interfering signals received from the neighboring APs are, the ACI from the neighboring APs may increase the effective NF of the channel at which the AP 200 operates to such extend that the AP 200 may only be able to communicate with its clients according to the lowest modulation and coding scheme (MCS) or in some cases may not be able to communicate with its clients. In other words, the ACI signals negatively impacts the receive sensitivity of the AP 200.

Accordingly, the TILT is determined for the AP 200. The TILT quantifies the effect of ACI (at different interference levels) on the receive sensitivity of the AP 200. In other words, TILT provides the effective NF of the AP 200, when AP 200 operates at channel $c_i$, and an interfering signal with a given IL or within a given IL range is received from another AP at channel $c_j$, where i is different from j. In at least one example embodiment, the TILT is based on laboratory measurements and is to be determined as follows.

During the laboratory measurement, two APs are connected to each other in a conducted antenna test setup. One of the two APs is tuned to one channel frequency (e.g., receiving AP) while the other one of the two APs (e.g., interfering AP) is tuned to each of the remaining channel frequencies, one at a time. At each of the remaining channel frequencies, while the interfering AP sends packets to the receiving AP at varying ILs, for each MCS level, the receive sensitivity of the receiving AP is measured and tabulated. The receive sensitivity of the receiving AP may also be referred to as a required minimum signal strength (RMSS) of the receiving AP. In at least one example embodiment, the results of the measurements are tabulated as shown in Table II. In the given example, it is assumed that the receiving AP uses 40 MHz bandwidth. In other embodiments, depending on the used protocol, such as but not limited to, IEEE 802.11a/b/g/n/ac, the AP may employ 20 MHz, 80 MHz and 160 MHz bandwidths as well, in such embodiments Table II should be generated accordingly.

TABLE II

| Operating Channel | Interfering Channel | Interference Level (dBm) | Required Minimum Signal Strength for MCS7 (dBm) |
|---|---|---|---|
| 36 | 44 | −40 ≤ IL | −45 |
| | | −50 ≤ IL < −40 | −50 |
| | | −60 ≤ IL < −50 | −60 |
| | | −70 ≤ IL < −60 | −66 |
| | | IL < −70 | −70 |

TABLE II-continued

| Operating Channel | Interfering Channel | Interference Level (dBm) | Required Minimum Signal Strength for MCS7 (dBm) |
|---|---|---|---|
| | 52 | $-40 \leq$ IL | $-40$ |
| | | $-50 \leq$ IL $< -40$ | $-48$ |
| | | $-60 \leq$ IL $< -50$ | $-50$ |
| | | $-70 \leq$ IL $< -60$ | $-56$ |
| | | IL $< -70$ | $-70$ |
| | . | . | . |
| | . | . | . |
| | . | . | . |
| | 132 | $-40 \leq$ IL | $-60$ |
| | | $-50 \leq$ IL $< -40$ | $-70$ |
| | | $-60 \leq$ IL $< -50$ | $-70$ |
| | | $-70 \leq$ IL $< -60$ | $-70$ |
| | | IL $< -70$ | $-70$ |
| . | . | . | . |
| . | . | . | . |
| . | . | . | . |
| 132 | 36 | $-40 \leq$ IL | $-45$ |
| | | $-50 \leq$ IL $< -40$ | $-50$ |
| | | $-60 \leq$ IL $< -50$ | $-60$ |
| | | $-70 \leq$ IL $< -60$ | $-66$ |
| | | IL $< -70$ | $-70$ |
| | 44 | $-40 \leq$ IL | $-40$ |
| | | $-50 \leq$ IL $< -40$ | $-48$ |
| | | $-60 \leq$ IL $< -50$ | $-50$ |
| | | $-70 \leq$ IL $< -60$ | $-56$ |
| | | IL $< -70$ | $-70$ |
| | . | . | . |
| | . | . | . |
| | . | . | . |
| | 124 | $-40 \leq$ IL | $-60$ |
| | | $-50 \leq$ IL $< -40$ | $-70$ |
| | | $-60 \leq$ IL $< -50$ | $-70$ |
| | | $-70 \leq$ IL $< -60$ | $-70$ |
| | | IL $< -70$ | $-70$ |

In at least one example embodiment, Table II may provide the following information. Assuming a MCS level of 7 symbols, which will be described below, an AP at channel 36, that receives an interfering signal from channel 44 with an interference level of −45 dBm, has a RMSS of −50 dBm. This may be denoted by RMSS (35, 44, −45, 7)=−50 dBm. Using the measured receive sensitivity of the other AP and the minimum signal to interference and noise ratio (SINR) required to decode a symbol at one of the MCS levels, an effective NF of the other AP at each channel is determined.

Table III provides an example embodiment, of how a SINR is determined for each MCS level. Table III provides several MCS, at each of which a data packet with a given Quadrature Amplitude Module (QAM) and a given coding rate can be successfully decoded if the SINR is the corresponding SINR. For example, according to MCS 7, a packet with a 64-QAM and a 5/6 rate can be decoded successfully if the SINR is 32 dB. The example embodiment of Table III is an IEEE 802.11 standard.

TABLE III

| MCS | Modulation | Coding rate | SINR |
|---|---|---|---|
| 0 | BPSK | 1/2 | 1 |
| 1 | QPSK | 1/2 | 1 |
| 2 | QPSK | 3/4 | 1 |
| 3 | 16-QAM | 1/2 | 2 |
| 4 | 16-QAM | 3/4 | 2 |
| 5 | 64-QAM | 2/3 | 3 |
| 6 | 64-QAM | 3/4 | 3 |
| 7 | 64-QAM | 5/6 | 3 |
| | | | 2 |

Thereafter, in at least one example embodiment, the effective NF is determined based on the measured receive sensitivity (e.g., using Table II above) and the SINR provided in Table III. In at least one example embodiment, the effective NF is determined as follows.

$$NF(c_i,c_j,\text{IL}) = RS(c_i,c_j,\text{IL},m) - SINR(m) \tag{1}$$

where NF $(c_i, c_j, \text{IL})$ is the effective NF of AP 200, when AP 200 operates on channel frequency $c_i$, with an interference received from another AP at channel $c_j$ with an interference level IL, RS $(c_i, c_j, \text{IL}, m)$ is the received sensitivity of the AP 200 to decode m MCS symbols at channel frequency $c_i$, with an interference received from another AP at channel $c_j$ with an interference level IL (e.g., RMSS of the AP 200) and SINR (m) is the signal to interference and noise ratio for the m MCS symbols. In at least one example embodiment, while the RMSS and the SINR of the AP 200 for each m MCS symbols may be different, the difference between the RMSS and the SINR for different m MCS symbols is constant.

In at least one example embodiment, the determined effective NF for a given MCS symbol is tabulated. Table IV illustrates an example embodiment of a TILT, which provides the effective NFs of the AP 200, when operating on channel frequency $c_i$, with an interference received from another AP at channel $c_j$ with varying interference levels IL.

In at least one example embodiment, when multiple ACI signals from multiple interfering channels are received at the AP 200 operating at channel $c_i$, the effective NF is the highest NF among the NFs determined for each interfering channel.

TABLE IV

| Operating Channel | Interfering Channel | Interference Level (dBm) | Noise Floor (dBm) |
|---|---|---|---|
| i | j | $-40 \leq$ IL | $NF_1$ (i, j) |
| | | $-50 \leq$ IL $< -40$ | $NF_2$ (i, j) |
| | | $-60 \leq$ IL $< -50$ | $NF_3$ (i, j) |
| | | $-70 \leq$ IL $< -60$ | $NF_4$ (i, j) |
| | | IL $< -70$ | $NF_5$ (i, j) |

Table II, Table III and Table IV, are stored in the storage element 205 of the AP 200 and used by the IACS code, when the IACS is executed by the processor 203 to perform the functions described above. In at least one example embodiment, Table I is stored in the memory 204, as the processor periodically needs to access the RILT to determine the effective NF for each channel. In at least one example embodiment, Table II is also stored in the memory 204 for similar reasons as Table I.

In operation S315, the AP 200 determines whether any clients (e.g., one or more UEs) are connected to AP 200 and thus measures the signal power of a signal received from any connected client. The AP 200 keeps signal strength information of clients connected to the AP 200. In at least one example embodiment, the information related to clients connected to the AP 200 are tabulated and stored in a table, as shown in Table V, below. As can be seen from Table V, the AP 200 stores information related to MAC address of any client connected to the AP 200 along with the updated signal strength of the connected client as well as the channel on which the client communicates with the AP 200. In order to maintain connectivity with all of its clients, the receive sensitivity of the AP 200 should be higher than the minimum signal strength of all the clients connected to the AP 200 at any given time. In at least one example embodiment, Table V is stored in the storage element 205 of the AP 200.

TABLE V

| MAC | Channel | RSS (dBm) |
|---|---|---|
| 18:28:61:24:08:7C | 132 | −76 |
| 18:28:61:24:08:AB | 132 | −65 |
| 18:28:61:16:78:1A | 132 | −50 |

If at operation S315, the AP 200 determines that no client is connected to AP 200, then at operation S320, the AP 200 determines the channel with the lowest effective NF to operate on. The AP 200 determines the channel with the lowest effective NF, based on the RILT and TILT, an example of which is described above.

However, if at operation S315, the AP 200 determines that one or more clients are connected to the AP 200, then at operation S325, the AP 200 determines the achievable throughput for each channel, which may also be referred to as achievable physical data rate. The AP 200 determines the achievable throughput, hereinafter referred to as throughput, as follows.

Let $m_{ik}(\gamma_{ik}(c_i))$ denote the maximum MCS level that can be supported with an SINR level of $\gamma_{ik}(c_i)$, which is a SINR of a signal transmitted from client k observed by the $AP_i$ (e.g., AP 200) at channel Q. In at least one example embodiment, $\gamma_{ik}(c_i)$ is determined based on the following equation:

$$\gamma_{ik}(c_i) = \frac{P_{ik}(c_i)}{N_0 + \sum_{\substack{j=1 \\ i \neq j}}^{N} \rho(P_{ij}(c_j), c_i)}, \qquad (2)$$

$P_{ik}(c_i)$ is the average transmit power with which a packet transmitted by from node k is received at the AP 200, at the channel $c_i$. $P_{ik}(c_i) = P_k \sigma^2_{hik}$, where $P_k$ is the average transmit power of an AP at node k and $\sigma^2_{hik}$, is the mean channel gain (e.g., $E\{|h_i|^2\} = \sigma^2_{hi}$), where E is the expected value. Furthermore, $\rho(P_{ij}(c_j), c_i)$ is the average power level of a signal transmitted from $AP_j$ at channel $c_j$ and received by $AP_i$ at channel $c_i$. $N_0$ is an expected value of additive white Gaussian noise at all channels. In at least one example embodiment, $N_0$ is approximated as $N_0 = kTB$, where k is the Boltzmann constant, T is the temperature of the receiver and B is the signal bandwidth.

In at least one example embodiment, when determining $\gamma_{ik}(c_i)$, the AP 200 takes into account the different maximum equivalent isotropic radiated power (EIRP) regulations through the band of operation. For example, according to the European Standards, in a 5 GHz band, the maximum transmission power for an AP to communicate with its client on a low band channel (e.g., one of channels 36-64), is 23 dBm. Similarly, in the 5 GHz band, the maximum transmission power for the AP to communicate with its client on a high band channel (e.g., one of channels 100 and above), is 30 dBm. As such, the AP preferably avoids switching to a low power level channel from a high power level channel, when the AP-client connection is week. In at least one example embodiment, $P_k$ is constrained with the maximum available transmit power budget, depending on the channel on which the AP 200 operates.

While the transmission powers in the low band and high band may be different according to the U.S. standards, the same concept of considering the maximum transmission power applies, when the AP 200 determines $\gamma_{ik}(c_i)$.

In at least one example embodiment, the maximum MCS level that is supported with an SINR level of $\gamma_{ik}(o)$, determined using equation (2), is determined based on Table III. For example, if the determined SINR level is 32 dB, then referring to Table III, the maximum MCS level that is supported is 7 MCS symbols.

Thereafter, the AP 200 determines a physical data rate between node i and node k (where the AP 200 may be at either one of the nodes (e.g., clients) i and k) that is achievable at channel $c_i$. This physical data rate may be denoted by $r_{ik}(c_i)$, and in at least one example embodiment, is given as:

$$r_{ik}(c_i) = g(m_{ik}(\gamma_{ik}(c_i)), S) \cdot \tau(c_i) \qquad (3)$$

where S is set of system specific parameters including a channel's guard interval (GI), the channel's bandwidth and the number of antennas at the transmitter and receiver sides. The function g outputs a physical data rate at channel $c_i$ based on the maximum MCS level and the set of parameters S.

In one example embodiment, the form of function g may be based on laboratory measurements. For example, during laboratory trials and studies, the behavior of the physical data rate as a function of S and/or the maximum MCS level is determined, tabulated and/or visualized.

Figure 4A:
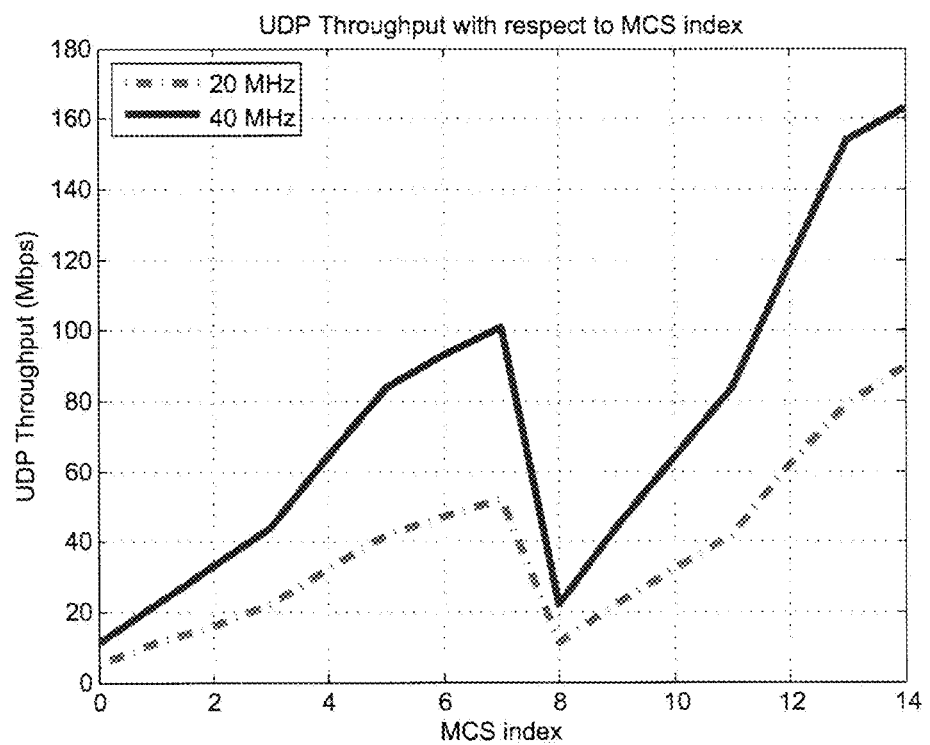
FIGS. 4A-B illustrate the achievable physical data rate with respect to the MCS level for a given number of antennas at the transmitter and the receiver sides, according to example embodiments.
Figure 4B:
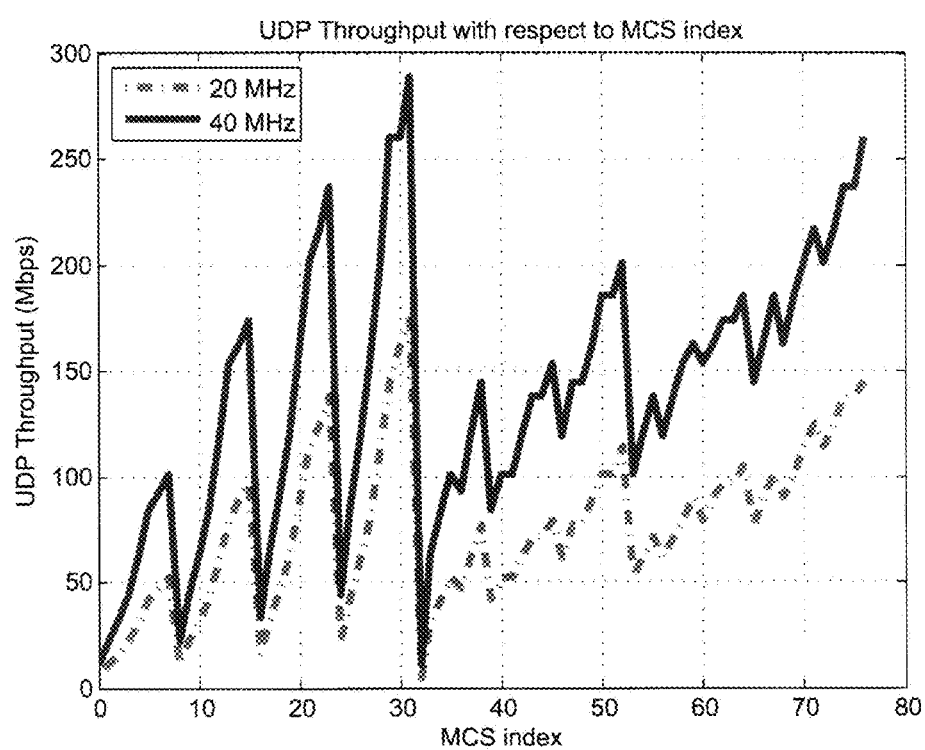

FIGS. 4A-B illustrate the achievable physical data rate with respect to the MCS level for a given number of antennas at the transmitter and the receiver sides, according to example embodiments. In at least one example embodiment shown in FIG. 4A, the number of antennas at the transmitter and receiver sides is two (e.g., the variable S is 2). Given that S is 2, FIG. 4A illustrates how the physical data rate (UDP throughput of the AP 200 at a channel $c_i$ changes as function of the maximum MCS levels. Moreover, the dashed line represents an example in which the bandwidth of each frequency channel is 20 MHz, while the solid line represents an example in which the bandwidth of each frequency channel is 40 MHz.

In at least one example embodiment shown in FIG. 4B, the number of antennas at the transmitter and receiver sides is four (e.g., the variable S is 4). Given that S is 4, FIG. 4B illustrates how the physical data rate (UDP throughput of the AP 200 at a channel $c_i$ changes as function of the maximum MCS levels. Moreover, the dashed line represents an example in which the bandwidth of each frequency channel is 20 MHz, while the solid line represents an example in which the bandwidth of each frequency channel is 40 MHz.

Referring back to FIG. 3 and equation (3), in at least one example embodiment, the AP 200, having determined the physical data rate (e.g., function g of equation (3)), multiplies the resulting physical data rate by the available airtime, provided in Table I discussed above, to determine $r_{ik}(c_i)$, which is the achievable physical data rate for channel $c_i$.

As indicated above, the AA information may or may not be available. In at least one example embodiment in which the AA information is not available (which as mentioned above may be referred to as IACS without AA), the achievable physical data rate is simply determined as follows:

$$r_{ik}(c_i) = g(m_{ik}(\gamma_{ik}(c_i)), S) \qquad (4)$$

Thereafter, at operation S330, the AP 200 determines a frequency channel to operate on. The determined frequency channel has the maximum physical data rate between the AP 200 and a client connected to AP 200, which has the lower SINR among all clients connected to the AP 200. In other words, the AP 200 finds/selects a channel that maximizes $r_{ik}(c_i)$ among all clients connected to AP 200.

In at least one example embodiment, the AP 200 may have stored there a computer code, which when executed by the processor 203, implements Algorithm II, shown below. Algorithm II may be referred to as the Interference Aware Channel Selection algorithm, corresponding to operations performs at S315-S330.

---

Algorithm II
Algorithm 2: Interference Aware Channel Selection

---

S : Sorted lim of channels in RILT;
S ← |S|;
/*S(1) is the channel that encounters the lowest interference level*/
/*S(S) is the channel that encounters the highest interference level*/
Compute τ(c) Ser end S(c), where c = 1,..., S;
for i ← 1 to S do
    /*R denotes the estimated rate rector and R(i) represents $i^{th}$
    element of this vector,*/
    /*NF denotes the estimated NF and NF(i) represents $i^{th}$ element
    of this vector,*/
    for j ← 1 to S do
        if S(i) ≠ S(j) then
            NF(i) ← Compute NF using (4);
            if client connected then
                R(i) ← Compute achievable physical rate for the client
                with the minimum signal strength using (2);
    $R_m$ (i) ← min(R);
    $NF_m$ (i) ← max(NF);
if client connected then
    $R_m^*$ ← max $R_m$; /*Maximum achievable PHY rate*/
    $c^*$ ← arg max $R_m$; /*Best channel*/
else
    $NF_m^*$ ← min $NF_m$ /*Minimum achievable NF*/
    $c^*$ ← arg min $NF_m$; /*Best channel*/

---

In at least one example embodiment, if the AP 200 determines that two or more channels equally provide the best data throughput in the presence of one or more clients connected to the AP 200, or the same lowest NF in the case of no client being connected to the AP 200, the AP 200 selected the channel with the lowest frequency to operate on.

In at least one example embodiment, the AP 200 selects not only the channel with best data throughput, the AP 200 also prioritizes channels in a descending order with respect to their data throughput. In at least one example embodiment, the AP 200 may create a list of the prioritized frequency channels.

Referring back to the example embodiment, in which the AP 200 considers the existence of radar signals transmitted by radar systems, in at least one example embodiment, the AP 200, upon selecting a channel with the best data throughput, periodically determines whether a radar signal is transmitted on the selected channel or not (e.g., every 1 minute, 5 minutes, etc.). If the AP 200 determines that a radar signal is being transmitted on the selected channel, the AP 200 switches to the next best channel from the list of prioritized frequency channels described above. As mentioned above, in at least one example embodiment, the AP 200 utilizes the radar detection method described in the U.S. application Ser. No. 13/558,170, incorporated herein by reference in its entirety.

Furthermore, in at least one example embodiment, the AP 200 utilizes the radar avoidance method described in the U.S. application Ser. No. 13/558,170, incorporated herein by reference in its entirety.

At operation S335, the AP 200 starts a timer, based on which the AP 200 determines whether to reiterate the functions performed at operations S305-S330. In at least one example embodiment, such reiteration is for the purpose of rescanning the channels, updating the RILT table and finding an appropriate channel to operate on, since the best channel with the maximum throughput at one instance of time may not be the same as the best channel with the maximum through at another instance of time.

At operation S340, the AP 200 determines whether the time is OFF. If at operation S340, the AP 200 determines that the timer is OFF, then the process reverts back to operation S305 and the AP 200 repeats S305-S340. However, if at operation S340, the AP 200 determines that the timer is still ON, then AP 200 repeats S340 until the AP 200 determines that the timer is OFF.

In at least one example embodiment, the AP 200 is a mesh node that is part of a mesh network. In a mesh network, different APs communicate with one another. For example, each AP is configured to form, either automatically or manually, a mesh network with other APs in its vicinity. At the same time, each different AP may receive different interference signals in its vicinity. If each AP performs IACS process, as described above, then different APs may determine different channels as channels having the maximum throughput, as discussed above.

Figure 5:
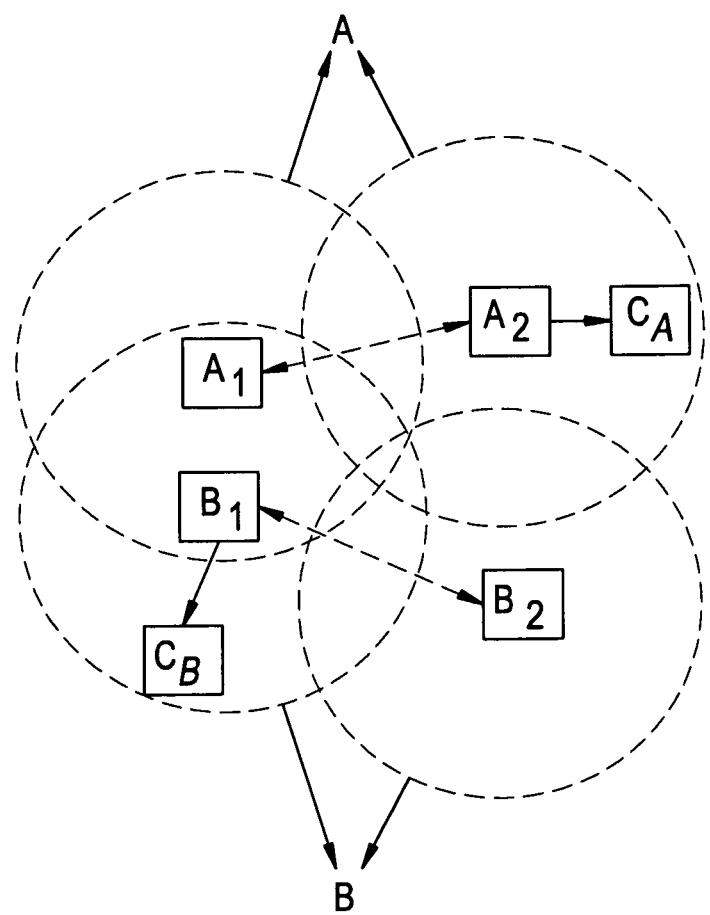
FIG. 5 illustrates two mesh networks transmitting in the vicinity of each other, according an example embodiment.

FIG. 5 illustrates two mesh networks transmitting in the vicinity of each other, according an example embodiment. As shown in FIG. 4, mesh network A is in the vicinity of mesh network B. Furthermore, mesh network A has APs $A_1$ and $A_2$ as well as client $C_A$. Mesh network B has APs $B_1$ and $B_2$ with client $C_B$. In the example of FIG. 5, while AP $A_1$ and AP $B_1$ receive interfering signals from one another, $A_2$ is unaware of any interference signal from $B_1$. Similarly, $B_2$ is unaware of any interfering signal from $A_2$, which may result in $A_2$ determining a different frequency channel to operate on as compared to $A_1$ and similarly $B_2$ selecting a different frequency channel from $B_1$ to operate on.

Figure 6:
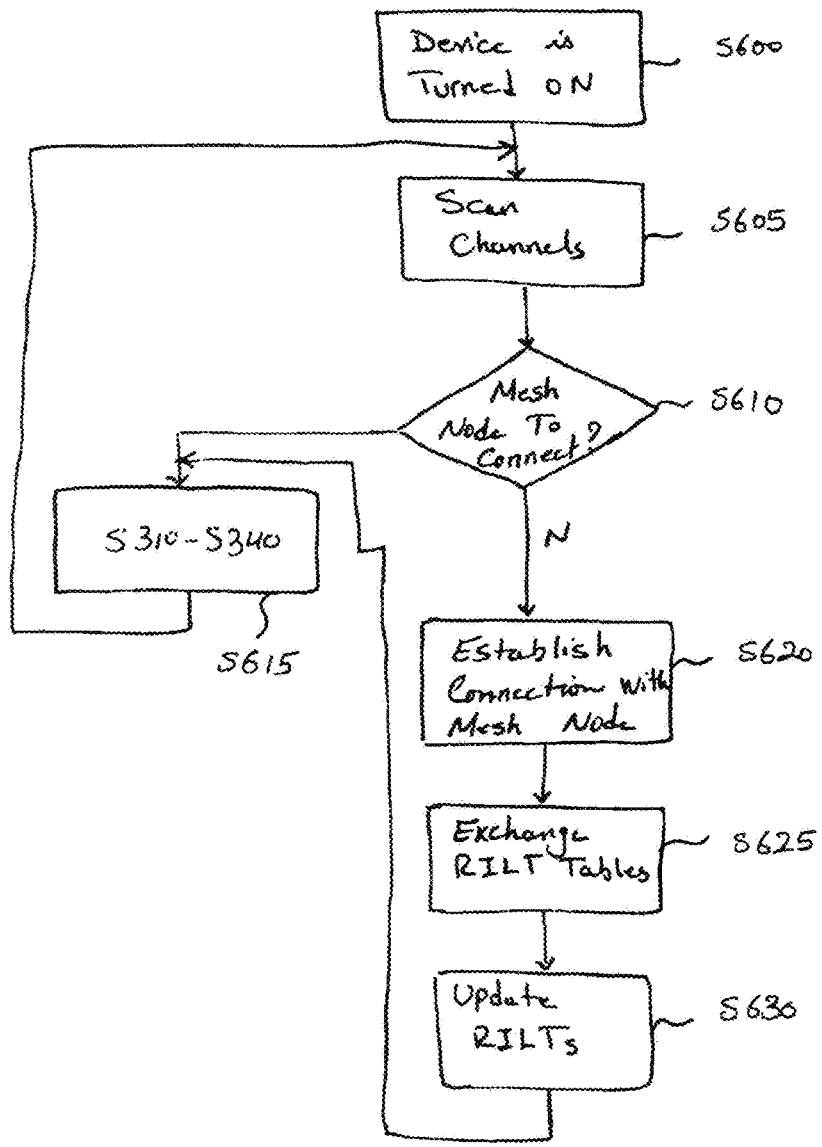
FIG. 6 illustrates a flow chart for performing an Interference Aware Channel Selection process in a mesh network, according to an example embodiment.

To address the discrepancy that may result from selecting different channels to operate on, when the AP 200 is a node of a mesh network, the RILTs of all nodes in a mesh network are synchronized. FIG. 6 illustrates a flow chart for performing an Interference Aware Channel Selection process in a mesh network, according to an example embodiment.

At operation S600, the AP 200 is turned on. At operation S605, the AP 200, scans available channels in a frequency band. The operation at S605 is the same as the operation at S305, described above with respect to FIG. 3.

At operation S610, the AP 200 determines whether the AP 200 is part of a mesh network (i.e., AP 200 is not a mesh node). If at operation S610, the AP 200 determines that the AP 200 is not a mesh node, then at operation S615, the AP 200 performs the operations S310-S340, as described above with reference to FIG. 3.

However, if at operation S610, the AP 200 determines that the AP 200 is a mesh node, then at S620, the AP 200 establishes communication with other AP(s) of the mesh network to which the AP 200 belongs.

In at least one example embodiment, the determination by the AP 200 as to whether the AP 200 is part of a mesh network and/or the establishing of communication with other AP(s) of such mesh network is based on methods/procedures described in U.S. application Ser. No. 14/166,040, incorporated herein by reference, in its entirety.

Thereafter, at operation S625, the AP 200 exchanges its RILT table with other mesh nodes of the mesh network to which the AP 200 belongs. At operation S630, the AP 200 updates its RILT based on the exchange of RILT tables at S625. In at least one example embodiment, after the updating RILT table of each mesh node of the mesh network is the same.

In at least one example embodiment, the RILT of AP 200 is the Table I, described above. Furthermore, an RILT of another mesh node (e.g., Node B) of the mesh network to which the AP 200 belongs is given as shown in Table VI.

TABLE VI

| Node B | | | | | | | | | |
|---|---|---|---|---|---|---|---|---|---|
| | Channel | | | | | | | | |
| | 36 | 44 | 52 | 60 | 100 | 108 | 116 | 124 | 132 |
| Interference Level (dBm) | −60 | −70 | −80 | −80 | −70 | −65 | −55 | −80 | −65 |
| AA (%) | 30 | 50 | 60 | 100 | 100 | 30 | 50 | 100 | 50 |

In at least one example embodiment, upon exchanging RILTs, the updated RILT is given as shown below in table VII. As can be seen from Table VII, the updated/synchronized RILT, includes the higher IL level at each channel when comparing the RILTs of different mesh nodes. For example, Table I provides an IL of −55 dBm at channel 36 while Table VI provides an IL of −60 dBm at channel 36. Therefore, the updated/synchronized table includes the higher IL of the two tables I and VI (i.e., the −55 dBm IL of Table I)

TABLE VII

| Nodes A&B | | | | | | | | | |
|---|---|---|---|---|---|---|---|---|---|
| | Channel | | | | | | | | |
| | 26 | 44 | 52 | 60 | 100 | 108 | 116 | 124 | 132 |
| Interference Level (dBm) | −55 | −65 | −75 | −80 | −76 | −65 | −55 | −80 | −65 |
| AA (%) | 20 | 50 | 50 | 100 | 100 | 20 | 50 | 0 | 50 |

Thereafter, the process reverts back to operation S615, where the AP 200 repeats operations S310-S340, as described above with reference to FIG. 3.

Figure 7:
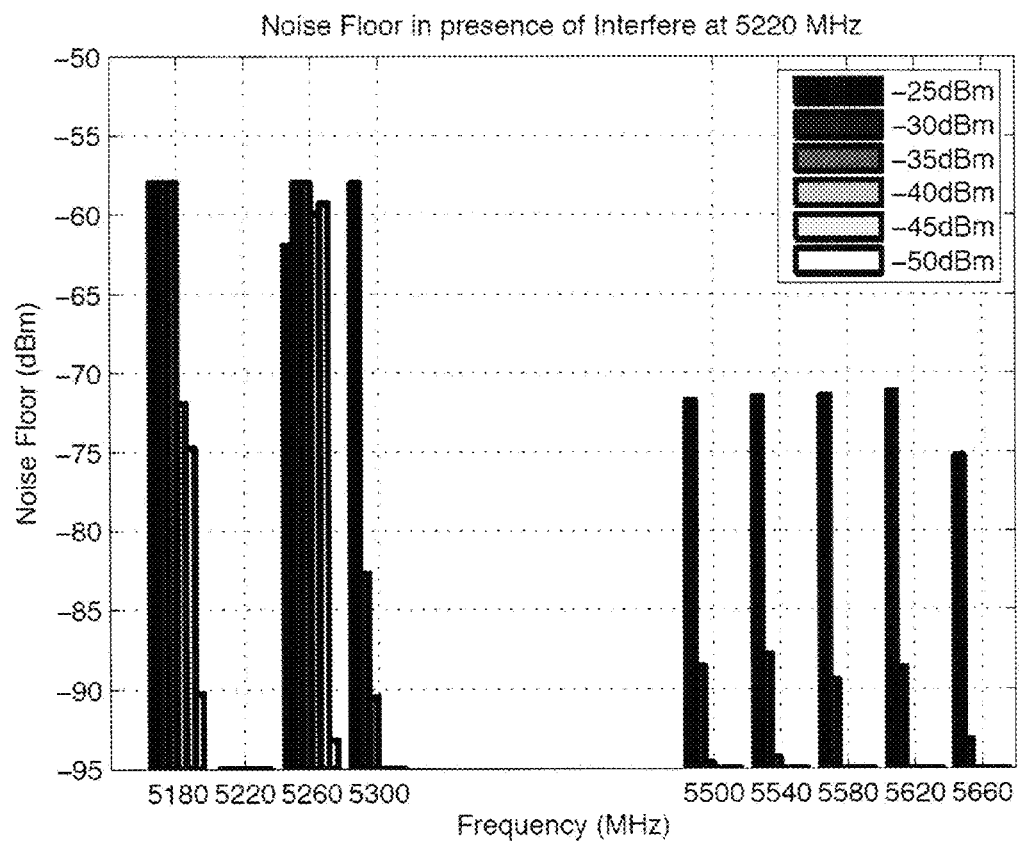
FIG. 7 illustrates a result of how the effective NF of an access point is impacted by the presence of an adjacent channel interfering signal, according to one example embodiment.

FIG. 7 illustrates a result of how the effective NF of an access point is impacted by the presence of an adjacent channel interfering signal, according to one example embodiment. In FIG. 7, it is assumed that the interfering signal is at 5220 MHz (which corresponds to channel 44 in the 5 GHz band). Then interfering signals received with different powers (expressed in dBm units) may result in different effective noise levels at other channels. For example, when the interfering signal is received from the 44$^{th}$ channel with a power of −35 dBm, then effective NF at non-overlapping adjacent channel (e.g., channel 36 at 5180 MHz) is −58 dBm. However, if the power of the interfering signal is −40 dBm, then the NF at the adjacent non-overlapping channels 36 is −72 dBm and the NF at the non-overlapping adjacent channel 52 is −60 dBm. Furthermore, FIG. 7 illustrates that the interfering signal not only has an impact on adjacent non-overlapping channels but it may also affect other non-overlapping channels that are not immediately adjacent to the channel from which the interfering signal is received (e.g., at 5500 MHz, 5540 MHz, etc., as shown in FIG. 7).

Figure 8:
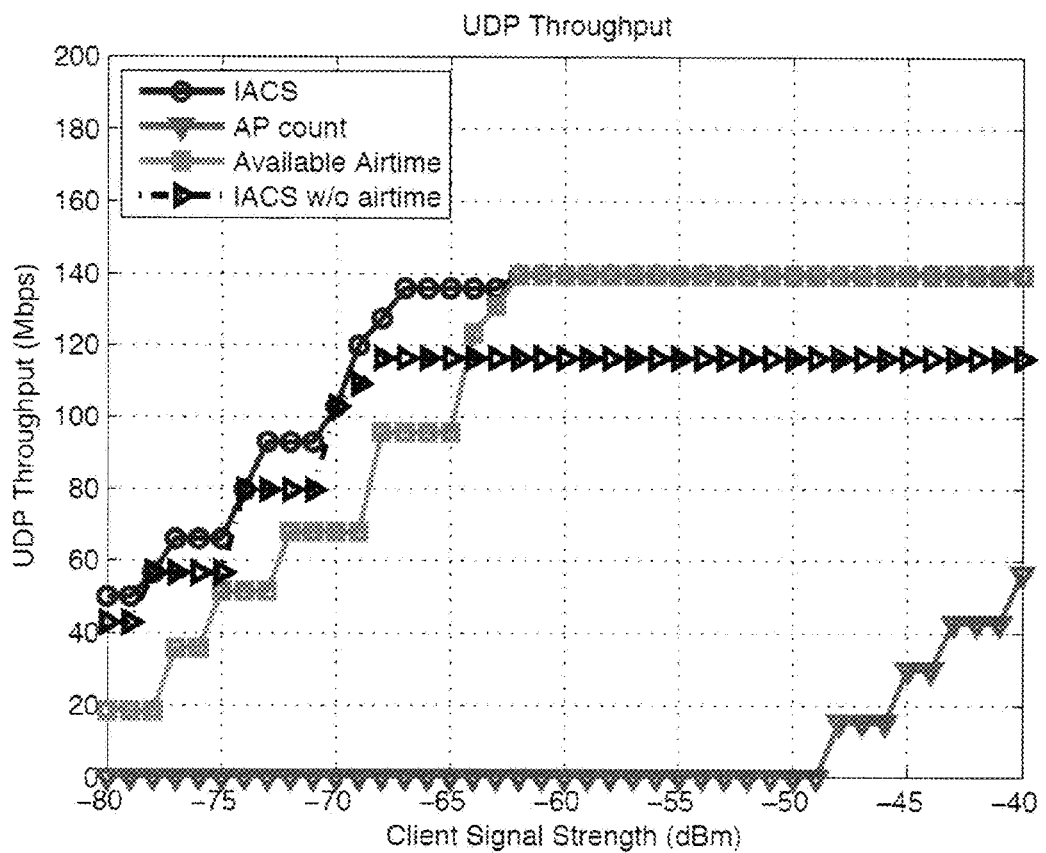
FIG. 8 illustrates a comparison between the IACS/IACS without AA methods and other available methods, according to one example embodiment.
Figure 1:
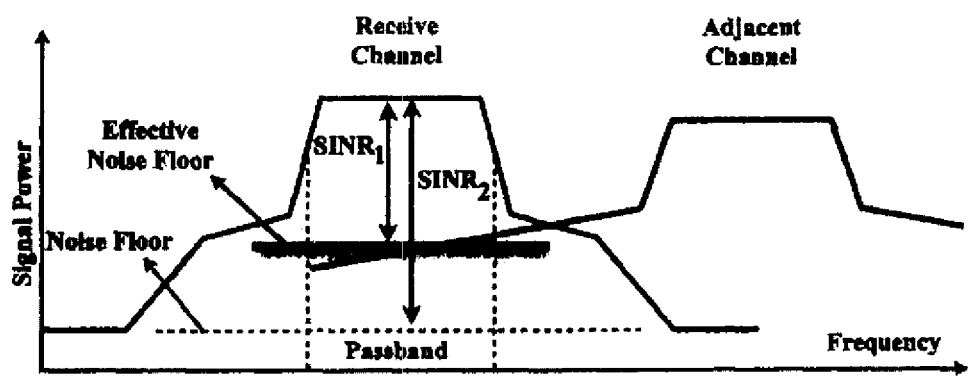
Figure 2:
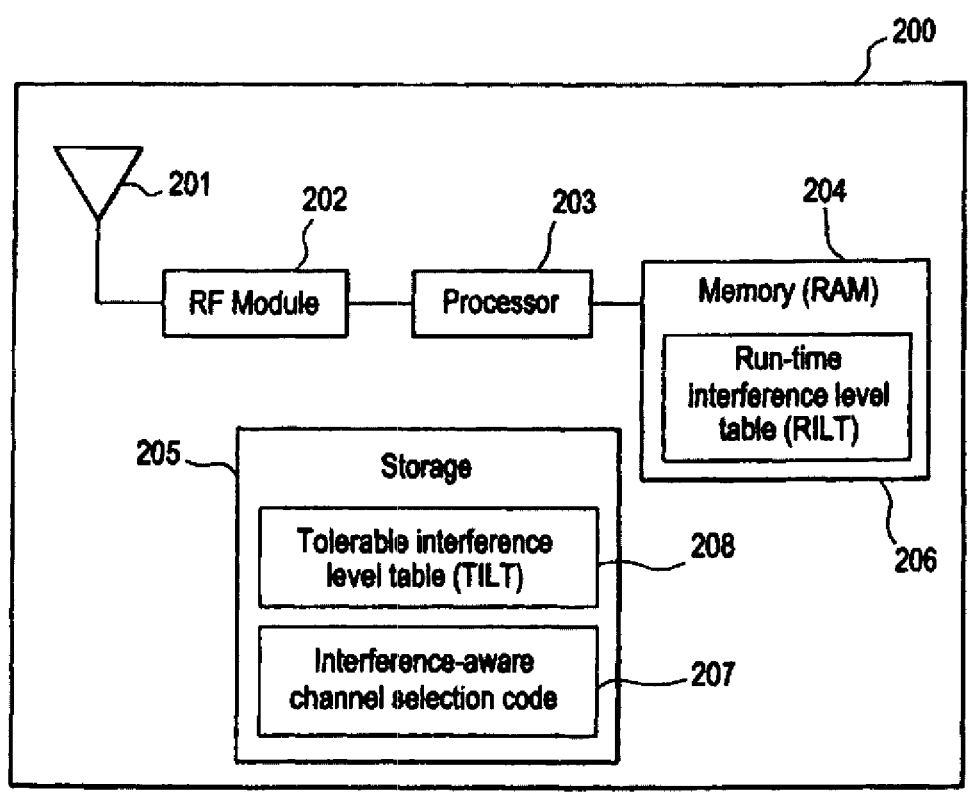
Figure 3:
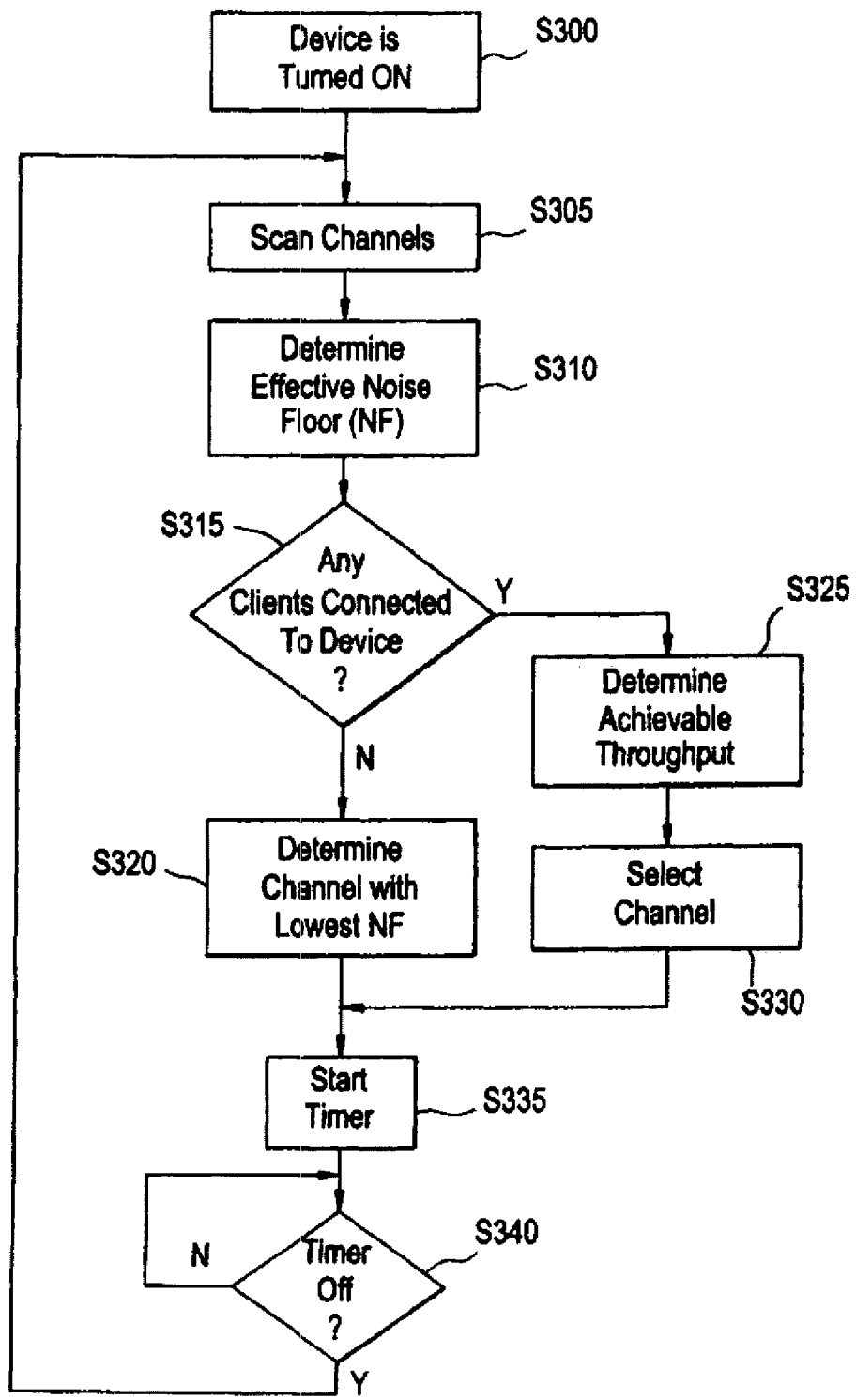
Figure 4A:
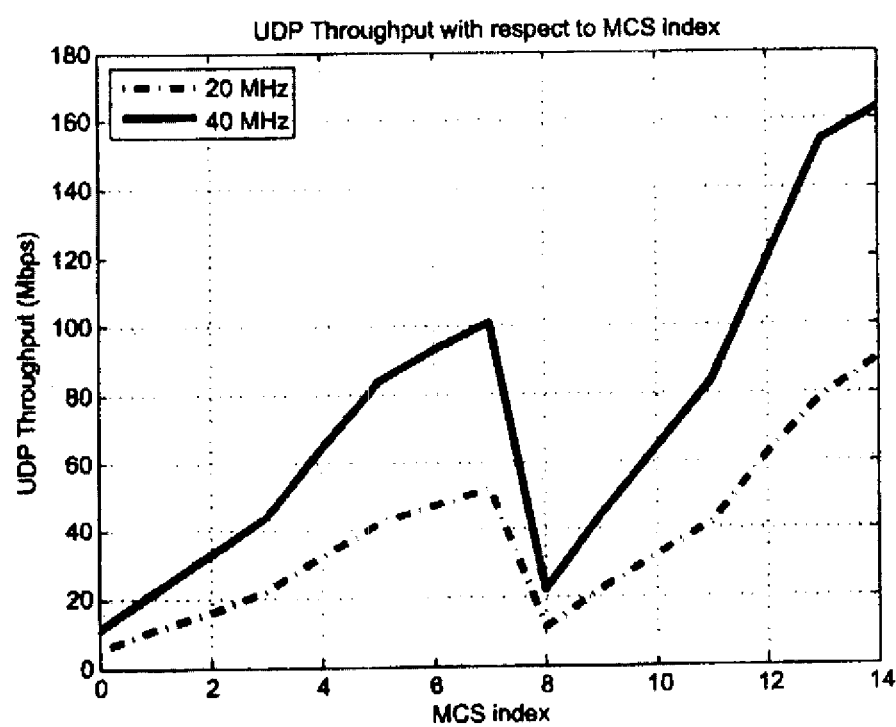
Figure 4B:
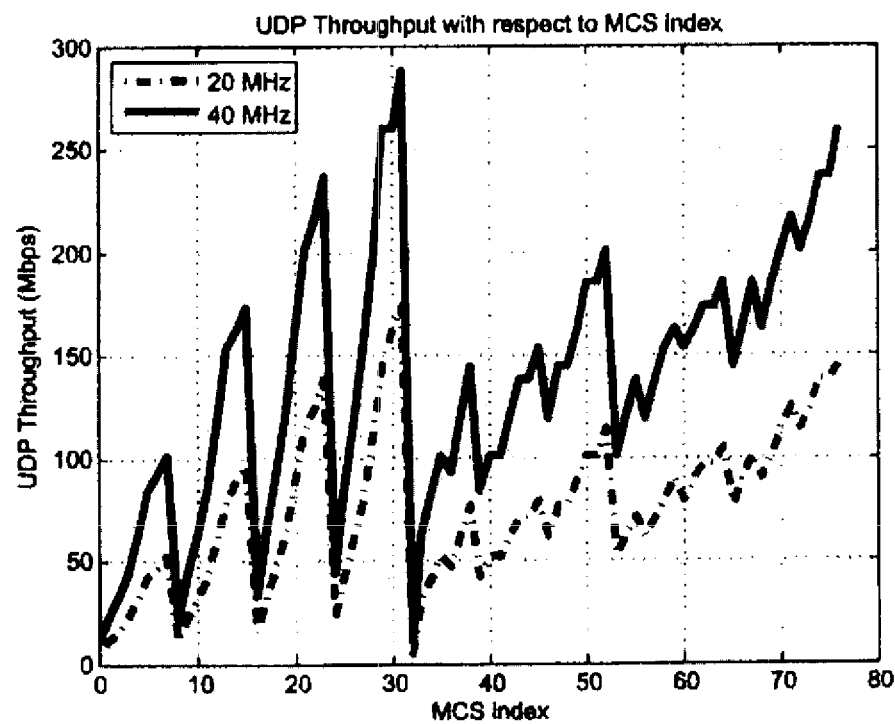
Figure 5:
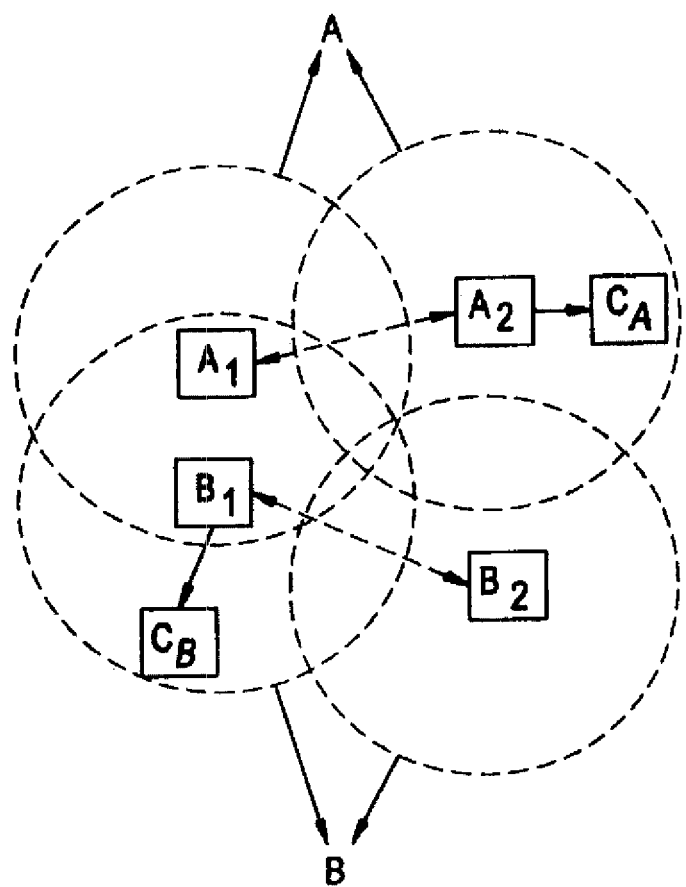
Figure 6:
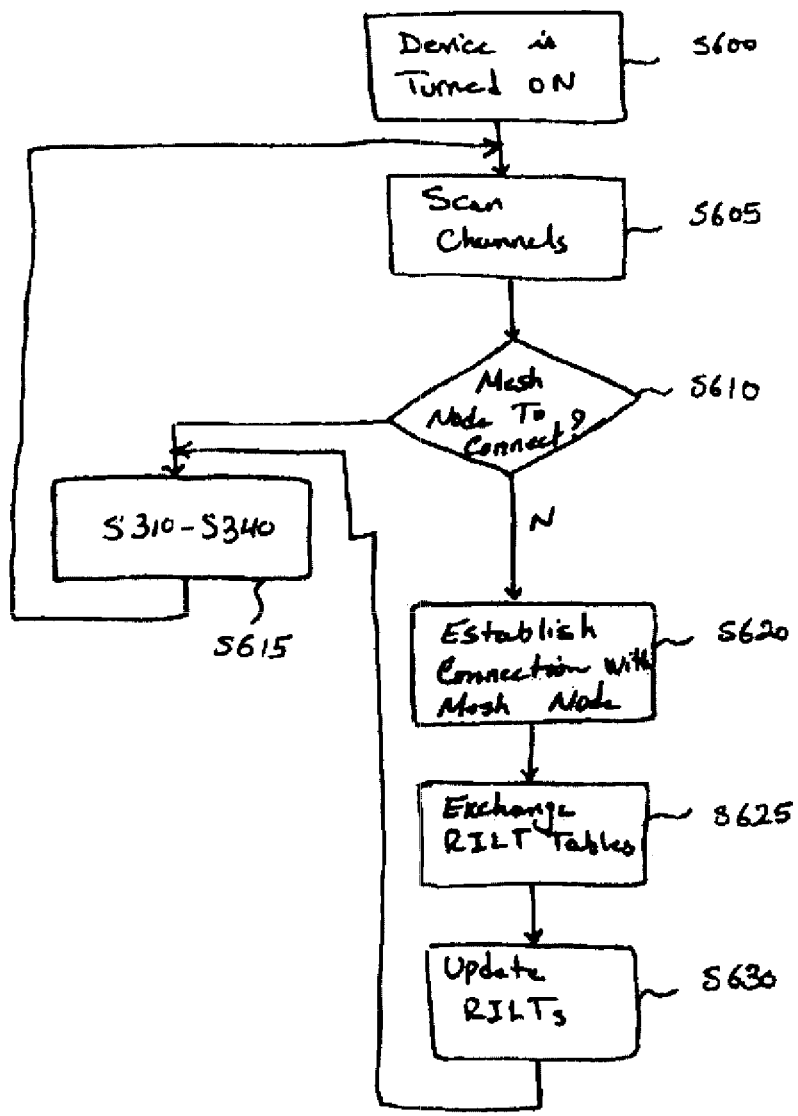
Figure 7:
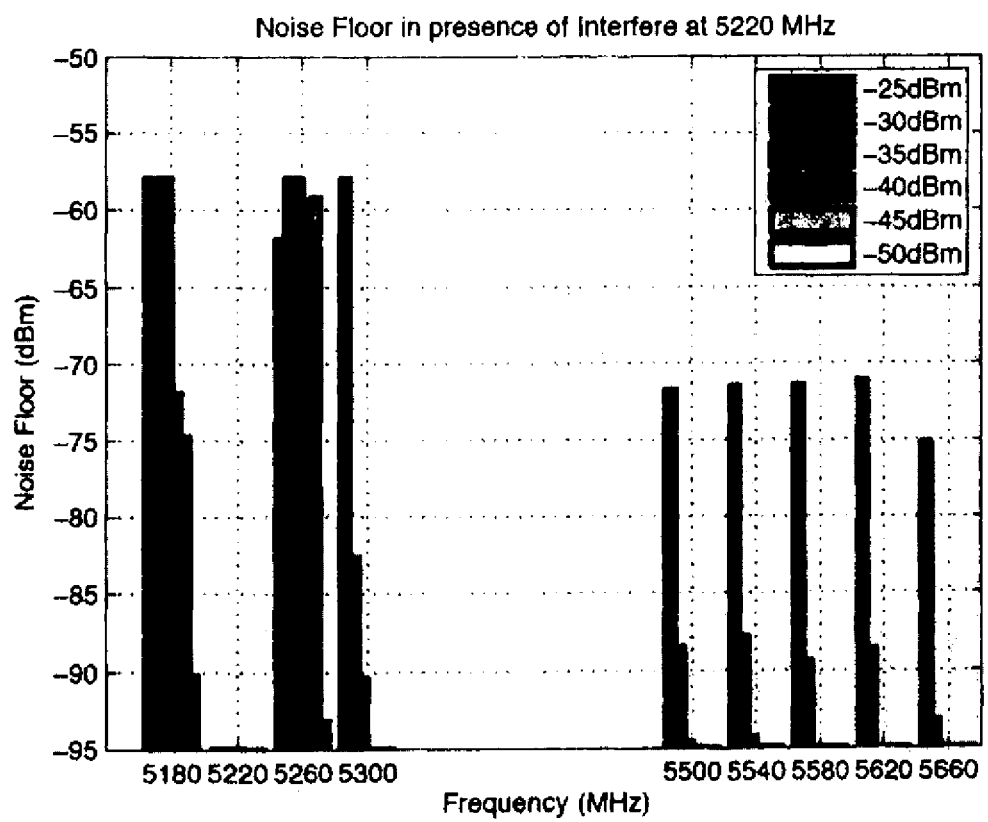
Figure 8:
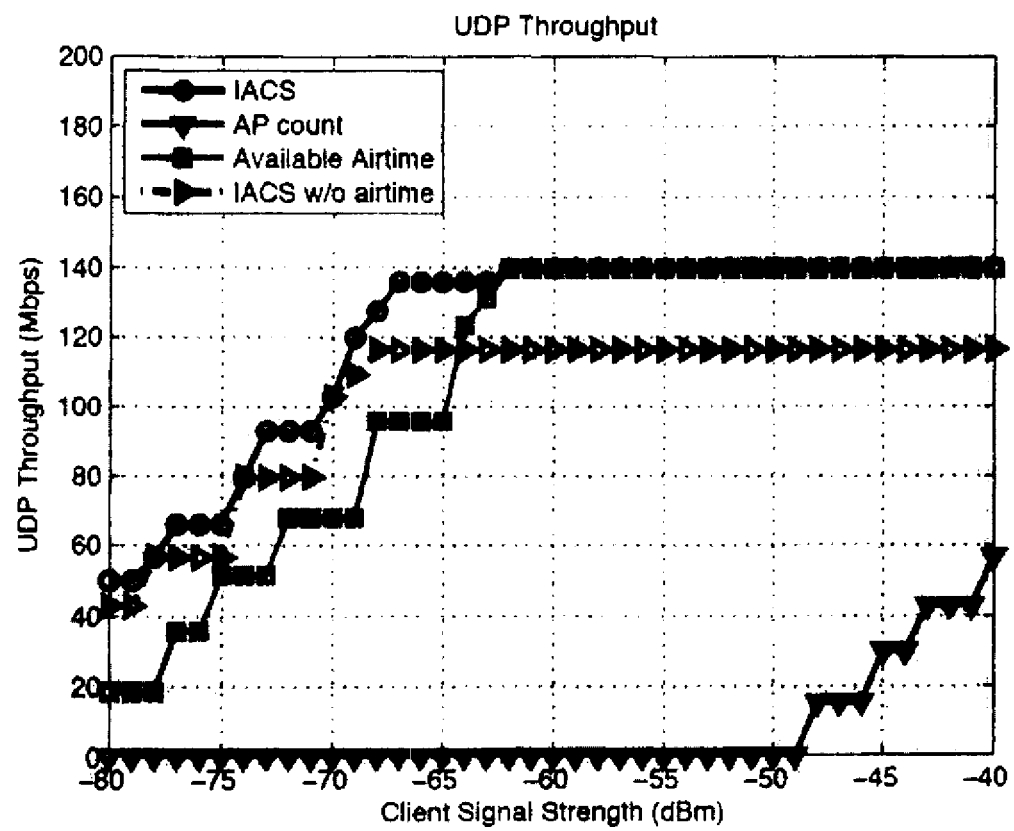

FIG. 8 illustrates a comparison between the IACS/IACS without AA methods and other available methods, according to one example embodiment. Other available channel selection methods may be referred to as the AP count method and the AA method. According to the AP count method, the channel that is observed to have the least number of APs is selected as the best channel. According to the AA method, the channel with the maximum AA is selected as the best channel.

As shown in FIG. 8, the throughput of an AP (e.g., AP 300) at the best channel selected according to IACS matches the throughput of the AP at the best channel selected according to the AA method, when the signal strength of signals received from the client at the AP is moderate to high (e.g. between −40 dBm to −65 dBm). However at the same signal levels the IACS outperforms the IACS without AA and the AP count method.

FIG. 8 further illustrates that when signal strength of signals received at the AP from its clients, is low (e.g., less than −65 dBm), the IACS method and the IACS without AA method outperform the AA method and the AP count method. In other words, the throughput of the AP at the best channel selected according to the IACS and the IACS without AA methods is significantly better than the throughput of the AP at the best channel selected according to either the AP count method or the AA method.

Although example embodiments have been shown and described, it would be appreciated by those skilled in the art that changes may be made in these embodiments without departing from their principles and spirit, the scope of which is defined in the claims and their equivalents.

Furthermore, while the above described example embodiments relate to a wireless communication system in which an AP wirelessly communicates with a client, the IACS methods described above (e.g., the IACS and the IACS method without AA), applies to any system involving a channel selection process. For example, the IACS may be, modified to correspond to parameters specific to power communication lines and subsequently applied to frequency notching in such power line communication system.

What is claimed is:

1. An access point (AP) configured to determine a frequency channel to operate on, the access point comprising:
a processor; and
a storage element having machine executable code therein that, when executed by the processor, causes the processor to operate on the frequency channel with a highest data throughput among available frequency channels by,
scanning the available frequency channels to determine at least an interference level of each of the available frequency channels, the interference level indicating a level of interference by one of a plurality of interfering signals at a corresponding one of the available frequency channels,
creating a table based on at least the interference level at each of the available frequency channels,
determining, for each of the available frequency channels, a tolerable interference level thereat using a tolerable interference level table (TILT), the tolerable interference level indicating a required minimum signal strength (RMSS) of the AP when the AP is operating on a respective one of the available frequency channels and the respective one of the available frequency channels experiences one of a plurality of interfering signals on an adjacent channel at one of a plurality of different signal strengths,
determining, for each of the available frequency channels, an effective noise floor associated therewith based on the interference level of the respective one of the available frequency channels indicated in the created table and the tolerable interference level at the respective one of the available frequency channels indicated in the TILT, the TILT indicating the effective noise floor for each of the available frequency channels based on tabulated results of measurements of the effect of adjacent channel interference at different signal strengths on a receive sensitivity of the AP, determining an available airtime for each of the available frequency channels, the available airtime indicating an amount of time when a corresponding one of the available frequency channels is idle, and updating, the created table by including the determined available airtime of each of the available frequency channels in the created table.

2. The access point of claim 1, wherein the machine executable code, when executed by the processor, causes the processor to determine whether at least one client is connected to the access point, the at least one client being a device communicating with the access point.

3. The access point of claim 2, wherein if the machine executable code, when executed by the processor, causes the processor to determine that no client is connected to the access point, the machine executable code, when executed by the processor, causes the processor to determine the frequency channel by selecting one of the available frequency channels with the lowest determined effective noise floor among the available frequency channels.

4. The access point of claim 2, wherein if the machine executable code, when executed by the processor, causes the processor to determine that the at least one client is connected to the access point, then the machine executable code, when executed by the processor, causes the processor to determine a signal strength of a signal received from the at least one client at the access point.

5. The access point of claim 4, wherein the machine executable code, when executed by the processor, causes the processor to determine the frequency channel by, determining a data throughput at each of the available frequency channels when the access point communicates with the at least one client over each of the available frequency channels based on the determined signal strength of the signal received at the access point and a set of system parameters; and selecting one of the available frequency channels at which a minimum data throughput when the access point communicates with the at least one client is maximized among the available frequency channels, the minimum data throughput being the data throughput when the access point communicates with the at least one client having a lowest signal to interference and noise ratio (SINR), the selected one of the available frequency channels being the frequency channel with the highest data throughput.

6. The access point of claim 5, wherein the set of system parameters include each of the available frequency channel's guard interval, each of the available frequency channel's frequency bandwidth and a number of antennas of the access point and the at least one client.

7. The access point of claim 1, wherein the machine executable code, when executed by the processor, causes the processor to determine the effective noise floor of each of the available frequency channels based on the updated created table and the TILT indicating the tolerable interference level at each of the available frequency channels, the frequency channel being determined based on at least the created table and the determined effective noise floor of each of the available frequency channels.

8. The access point of claim 7, wherein the machine executable code, when executed by the processor, causes the processor to determine whether at least one client is connected to the access point, the at least one client being a device communicating with the access point.

9. The access point of claim 8, wherein if the machine executable code, when executed by the processor, causes the processor to determine that the at least one client is connected to the access point, then the machine executable code, when executed by the processor, causes the processor to determine a signal strength of a signal received from the at least one client at the access point.

10. The access point of claim 9, wherein the machine executable code, when executed by the processor, causes the processor to determine the frequency channel by, determining a data throughput at each of the available frequency channels when the access point communicates with the at least one client over each of the available frequency channels based on the available airtime of each of the available frequency channels, the determined signal strength of the signal received at the access point and a set of system parameters; and selecting one of the available frequency channels at which a minimum data throughput when the access point communicates with the at least one client is maximized among the available frequency channels, the minimum data throughput being the data throughput when the access point communicates with the at least one client having a lowest signal to interference and noise ratio (SINR), the selected one of the available frequency channels being the frequency channel with the highest data throughput.

11. The access point of claim 10, wherein the set of system parameters include each of the available frequency channel's guard interval, each of the available frequency channel's frequency bandwidth and a number of antennas of the access point and the at least one client.

12. The access point of claim 1, wherein the machine executable code, when executed by the processor, causes the processor to determine whether the access point is a mesh node.

13. The access point of claim 12, wherein upon the machine executable code, when executed by the processor, causes the processor to determine that the access node is a mesh node, the machine executable code, when executed by the processor, causes the processor to, exchange the created table with other mesh nodes; and
synchronize the created tables among the mesh nodes.

14. The access point of claim 1, wherein the access point is a router.

15. The access point of claim 1, wherein the access point is configured to, periodically determine whether a radar signal is transmitted on the frequency channel with the highest data throughput, and switch and operate on a next best frequency channel from a list of prioritized frequency channels, if the access point determines that the radar signal is transmitted on the frequency channel with the highest data throughput, the next best frequency channel being a frequency channel with a second highest data throughput, the list of prioritized frequency channels being a list of frequency channels organized in descending order of their respective data throughput.

* * * * *

UNITED STATES PATENT AND TRADEMARK OFFICE
CERTIFICATE OF CORRECTION

PATENT NO. : 9,479,938 B2
APPLICATION NO. : 14/186690
DATED : October 25, 2016
INVENTOR(S) : Gokturk et al.

It is certified that error appears in the above-identified patent and that said Letters Patent is hereby corrected as shown below:

Please delete Patent 9,479,938 B2 in its entirety and insert Patent 9,479,938 B2 in its entirety as shown on the attached pages Signed and Sealed this
Sixth Day of December, 2016

Michelle K. Lee
*Director of the United States Patent and Trademark Office*

(12) United States Patent
Gokturk et al.

(10) Patent No.: US 9,479,938 B2
(45) Date of Patent: Oct. 25, 2016

(54) INTERFERENCE AWARE CHANNEL SELECTION SCHEMES

(71) Applicant: AIRTIES KABLOSUZ ILETISIM SAN. VE DIS TIC. A.S., Istanbul (TR)

(72) Inventors: Muharrem Sarper Gokturk, Istanbul (TR); Gulden Ferazoglu, Istanbul (TR); Metin Ismail Taskin, Istanbul (TR)

(73) Assignee: Airties Kablosuz Iletisim San. Ve Dis Tic. A.S., Istanbul (TR)

( * ) Notice: Subject to any disclaimer, the term of this patent is extended or adjusted under 35 U.S.C. 154(b) by 60 days.

(21) Appl. No.: 14/186,690

(22) Filed: Feb. 21, 2014

(65) Prior Publication Data
US 2015/0003404 A1 Jan. 1, 2015

Related U.S. Application Data

(60) Provisional application No. 61/841,478, filed on Jul. 1, 2013.

(51) Int. Cl.
*H04W 16/10* (2009.01)
*H04W 72/08* (2009.01)
*H04W 72/04* (2009.01)

(52) U.S. Cl.
CPC ......... *H04W 16/10* (2013.01); *H04W 72/0446* (2013.01); *H04W 72/0453* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 2003/0040319 A1* | 2/2003 | Hansen et al. | 455/452 |
| 2005/0003865 A1* | 1/2005 | Lastinger et al. | 455/562.1 |
| 2009/0270025 A1* | 10/2009 | Kossi et al. | 455/3.01 |
| 2010/0022262 A1* | 1/2010 | Aue | H04W 16/14 455/501 |
| 2011/0128920 A1* | 6/2011 | Lee et al. | 370/329 |
| 2011/0164527 A1 | 7/2011 | Mishra et al. | |
| 2012/0195220 A1* | 8/2012 | Kurt et al. | 370/252 |
| 2013/0136117 A1 | 5/2013 | Schrum, Jr. et al. | |
| 2013/0194944 A1* | 8/2013 | Soyak et al. | 370/252 |
| 2013/0235906 A1* | 9/2013 | Kim | H03L 7/00 375/144 |

OTHER PUBLICATIONS

"IEEE Standard for a Convergent Digital Home Network for Heterogeneous Technologies; IEEE Std. 1905.1-2013", IEEE Standard, IEEE Piscataway, NJ, USA, Apr. 12, 2013, pp. 1-93, XP068050268, ISBN: 978-0-7381-8297-1.

(Continued)

*Primary Examiner* — Ian N Moore
*Assistant Examiner* — Justin T Van Roie
(74) *Attorney, Agent, or Firm* — Harness, Dickey & Pierce, P.L.C.

(57) ABSTRACT

An access point is configured to determine a frequency channel to operate on. The access point includes a storage element having machine executable code therein that, when executed by a processor, cause the processor to determine the frequency channel with a highest data throughput among available frequency channels, which may undergo different levels of interference.

15 Claims, 9 Drawing Sheets

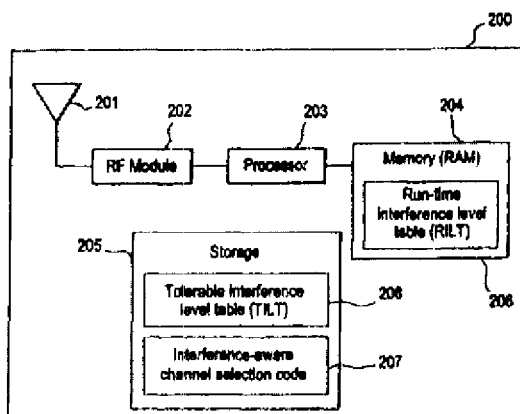

(56) References Cited

OTHER PUBLICATIONS

"AirTies Points Way to HD Video on Hybrid Wi-Fi/Powerline Networks", http://www.onlinereporter.com/2011/07/13/airties-points-way-to-hd-video-on-hybrid-wi-fipowerline-networks/, The Online Reporter, Jul. 13, 2011.

"IEEE Standard for a Convergent Digital Home Network for Heterogeneous Technologies; IEEE Std. 1905.1-2013", IEEE Standard, IEEE Piscataway, NJ, USA, Apr. 12, 2013, pp. 1-93, XP066050268, ISBN: 978-0-7381-8297-1.

European Search Report dated Jan. 5, 2015 for Application No. EP 14 16 7788.

* cited by examiner

INTERFERENCE AWARE CHANNEL SELECTION SCHEMES

PRIORITY INFORMATION

This application claims priority from U.S. Provisional Application No. 61/841,478 filed on Jul. 1, 2013, the entire contents of which are incorporated herein by reference.

BACKGROUND

Signals from radio access devices that operate on Institute of Electrical and Electronics Engineers (IEEE) 802.11, IEEE 802.15.4, Bluetooth technology or other comparable standards, generate some amount of energy outside of their approved spectrum band, which may be referred to as side band emissions.

Although devices that transmit/receive such signals employ filtering to minimize RF interference from adjacent channels, this interference also generates side lobe energy that falls into the pass band of signals that operate on IEEE 802.11, IEEE 802.15.4, Bluetooth technology or other comparable standards. If the adjacent channel interference (ACI) is much stronger than the 802.11 signal, side band energy from the ACI may dominate the channel's noise floor (NF) (e.g., increase the effective NF of the frequency channel).

The high level of ACI results in a NF that dominates the 802.11 channel's Signal to Interference and Noise Ratio (SINR), which in turn reduces WLAN signal strength by causing, for example, processing artifacts and quantization errors. Increased noise floor due to adjacent channel interference decreases the receive sensitivity of a device yielding unacceptably low throughput, and sometimes, even no throughput at all. Furthermore, in case of high ACI, the device will not be able to take any share of the airtime, e.g., it will not have access to the medium, since the interfering signals numb the Device's receiver (e.g., render the device's receiver inoperable with respect to receiving and filtering signals).

FIG. 1 illustrates the effect of adjacent interfering channel on a receiving channel's noise floor. As illustrated in FIG. 1, the energy emission from the adjacent channel increases the NF of the receive channel from the Noise Floor (dashed line) to the Effective Noise Floor (solid line), thus resulting in a lower SINR 2, as opposed to the SINR 1, if no interference was received at the receive channel from the adjacent channel.

IEEE specifies the required minimum spectral mask for the transmitted signals. However, even though transmitted signals satisfy the spectral mask requirements, the transmitters may still emit unwanted signals at image frequencies, which also constitute a source of interference for other nodes in the vicinity of a receiver at a given node. In order to suppress unwanted signals, each device applies adjacent channel rejection (ACR) at its receiver. ACR performance is inherently related to RF hardware design, such as the design of sideband and image filters. For example, two Access Point devices (APs), both satisfying the IEEE criterion on spectral requirements, in close vicinity of each other, may numb one another's receiver if the frequencies they operate at, cause high adjacent channel interference to one another. This effect may be one sided, meaning that one AP numbs the receiver of the other AP, yielding the numbed AP to stop all communications, while the other AP takes full share of the medium, i.e., airtime.

SUMMARY

At least one example embodiment relates to an access point configured to determine a frequency channel to operate on.

In at least one embodiment, the access point includes a storage element having machine executable code therein that, when executed by a processor, cause the processor to determine the frequency channel with a highest data throughput among available frequency channels.

In at least one embodiment, the machine executable code, when executed by the processor, causes the processor to, scan the available frequency channels for at least an interference level of each of the available frequency channels, the interference level indicating a level of interference by an interfering signal at a corresponding one of the available frequency channels and create a table based on at least the interference level at each of the available frequency channels, the frequency channel being determined based on at least the created table.

In at least one embodiment, the machine executable code, when executed by the processor, causes the processor to determine a noise floor of each of the available channels based on the created table and another table indicating a tolerable interference level at each of the available channels, the frequency channel being determined based on at least the created table and the determined noise floor of each of the available channels.

In at least one embodiment, the machine executable code, when executed by the processor, causes the processor to determine whether at least one client is connected to the access point, the client being a device communicating with the access point.

In at least one embodiment, if the machine executable code, when executed by the processor, causes the processor to determine that no client is connected to the access point, the machine executable code, when executed by the processor, causes the processor to determine the frequency channel by selecting one of the available channels with the lowest determined noise floor among the available frequency channels.

In at least one embodiment, if the machine executable code, when executed by the processor, causes the processor to determine that at least one client is connected to the access point, then the machine executable code, when executed by the processor, causes the processor to determine a signal strength of a signal received from the at least one client at the access point.

In at least one embodiment, the machine executable code, when executed by the processor, causes the processor to determine the frequency channel by determining a data throughput at each of the available channels when the access point communicates with the at least one client over each of the available channels based on the determined signal strength of the signal received at the access point and a set of system parameters. The machine executable code, when executed by the processor, further causes the processor to determine the frequency channel by selecting one of the available frequency channels at which a minimum data throughput when the access point communicates with the at least one client is maximized among the available frequency channels, the minimum data throughput being a data throughput when the access point communicates with the at least one client having the lowest signal to interference and noise ratio (SINR), the selected one of the available frequency channels being the frequency channel with the highest data throughput.

In at least one embodiment, the set of system parameters include each channel's guard interval, each channel's frequency bandwidth and a number of antennas of the access point and the at least one client.

In at least one embodiment, the machine executable code, when executed by the processor, causes the processor to determine an available airtime for each of the available frequency channels, the available airtime indicating an amount of time when a corresponding one of the available frequency channels is idle, and update the table by including the determined available airtime of each of the available frequency channels in the table.

In at least one embodiment, the machine executable code, when executed by the processor, causes the processor to determine a noise floor of each of the available channels based on the updated table and another table indicating a tolerable interference level at each of the available channels, the frequency channel being determined based on at least the created table and the determined noise floor of each of the available channels.

In at least one embodiment, the machine executable code, when executed by the processor, causes the processor to determine whether at least one client is connected to the access point, the client being a device communicating with the access point.

In at least one embodiment, if the machine executable code, when executed by the processor, causes the processor to determine that at least one client is connected to the access point, then the machine executable code, when executed by the processor, causes the processor to determine a signal strength of a signal received from the client at the access point.

In at least one embodiment, the machine executable code, when executed by the processor, causes the processor to determine the frequency channel by determining a data throughput at each of the available channels when the access point communicates with the at least one client over each of the available channels based on the available airtime of each of the available frequency channels, the determined signal strength of the signal received at the access point and a set of system parameters. The machine executable code, when executed by the processor, further causes the processor to determine the frequency channel by selecting one of the available frequency channels at which a minimum data throughput when the access point communicates with the at least one client is maximized among the available frequency channels, the minimum data throughput being a data throughput when the access point communicates with the at least one client having the lowest signal to interference and noise ratio (SINR), the selected one of the available frequency channels being the frequency channel with the highest data throughput.

In at least one embodiment, the set of system parameters include each channel's guard interval, each channel's frequency bandwidth and a number of antennas of the access point and the at least one client.

In at least one embodiment, the machine executable code, when executed by the processor, causes the processor to determine whether the access point is a mesh node.

In at least one embodiment, upon the machine executable code, when executed by the processor, causes the processor to determine that the access node is a mesh node, the machine executable code, when executed by the processor, causes the processor to exchange the table with other mesh nodes and synchronize the tables among the mesh nodes.

In at least one embodiment, the access point is a router.

In at least one embodiment, the router is based on at least one of IEEE 802.11, IEEE 802.15.4 and Bluetooth technology standard.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments.

FIG. 1 illustrates the effect of adjacent interfering channel on a receiving channel's noise floor;

FIG. 2 illustrates a block diagram of an access point, according to an example embodiment;

FIG. 3 illustrates a flow chart for performing an Interference Aware Channel Selection process, according to an example embodiment;

FIGS. 4A-B illustrate the achievable physical data rate with respect to the MCS level for a given number of antennas at the transmitter and the receiver sides, according to example embodiments;

FIG. 5 illustrates two mesh networks transmitting in the vicinity of each other, according an example embodiment;

FIG. 6 illustrates a flow chart for performing an Interference Aware Channel Selection process in a mesh network, according to an example embodiment;

FIG. 7 illustrates a result of how the effective NF of an access point is impacted by the presence of an adjacent channel interfering signal, according to one example embodiment; and FIG. 8 illustrates a comparison between the IACS/IACS without AA methods and other available methods, according to one example embodiment.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. However, example embodiments are not limited to these given implementations.

As used herein, the term "user equipment" (UE) may be considered synonymous to, and may hereafter be occasionally referred to, as a phone, wirelessly equipped laptop, a mobile, mobile unit, mobile user, subscriber, user, remote station, access terminal, tablet, receiver, smart television, etc., and may describe a remote user of wired or wireless resources in a network. The term "Access Point" (AP) may be considered synonymous to and/or referred to as a wired and/or wireless router, hub, switch, a public gateway, a public/private gateway, and/or other source of audio and/or data transmission usable by various UEs and may describe equipment that provides data and/or audio connectivity between the network and one or more UEs.

FIG. 2 illustrates a block diagram of an access point, according to an example embodiment.

Referring to FIG. 2, an access point (AP) 200, which may refer to any of the devices, described above, includes an antenna 201, a radio frequency (RF) module 202, a processor 203, a memory 204 and a storage element 205. The RF module 202 may be an electronic circuit capable of receiving/transmitting signals at one or more carrier frequencies (CF). The processor 203 executes computer code stored in the storage element 205 that, when executed, autonomously configures the AP 200 to select an operating frequency with the least amount of interference for establishing communication with user equipment (UEs) and/or other elements present within the AP 200's communication network. The memory 204 may be a read access memory and may have data stored thereon, such as Run-time Interference Level Table (RILT) 206, which will be further described below. The storage element 205 has stored thereon a code for selecting a carrier frequency with the least amount of interference from adjacent channels, for the AP 200 to operate on. The code may be referred to as Interference-aware channel selection code 207. The Interference-aware channel selection code, as described above, is executed by the processor 203. The storage element 205 also has stored thereon, a Tolerable Interference Level Table (TILT) 208, which will be further described below.

Hereinafter, a process carried out by the AP 200 for determining a carrier frequency to operate on will be described with respect to FIG. 3. The process may also be referred to as Interference Aware Channel Selection (IACS) process.

FIG. 3 illustrates a flow chart for performing an Interference Aware Channel Selection process, according to an example embodiment. At operation S300, the AP 200 is turned on. The AP 200 is turned on, for example, in response to receiving a request signal from a client (e.g., a receiver, a UE, etc.) for data.

In operation S305, the AP 200 scans available channels at a given frequency (e.g., channels at 2.4 GHz band, channels at 5 GHz band, etc.). The AP 200 scans the channels to obtain two types of information. The first type of information relates to a number of other APs present/operating on each available frequency channel that is scanned and an interference level (IL) experienced by the AP 200 from other available APs at each of the scanned channels. The second type of information is the available airtime at each channel that is scanned.

In order to obtain the first type of information on the number of other APs and a signal strength of each AP in the vicinity of AP 200, the AP 200, in at least one example embodiment, actively scans a given frequency band in which AP 200 operates (e.g., 2.4 GHz band, 5 GHz band, etc.). The AP 200 actively scans the given frequency band via, for example, probe request frames. Using the probe request frames, the AP 200 sends probe request frames at each channel and sorts the probe response frames from the other APs in the vicinity. The AP 200 further determines the signal strength with which the probe response frames are received (e.g., the power level of the signal via which each probe response frame from any other AP is received at the AP 200).

However, additional/alternative methods may be used to scan the given frequency band. In at least one example embodiment, the AP 200 utilizes passive scanning, in which the AP passively listens to the transmissions of the other devices in each channel, and obtains information about the neighboring nodes through, for example, beacon frames, etc.

In order to obtain the second type of information on the available airtime at each channel scanned by the AP 200, in at least one example embodiment, the AP 200 passively listens to each channel for a period of time (e.g., 100 ms). Such passive listening may be referred to as Clear Channel Assessment (CCA). During such passive listening, the AP 200 measures the amount of time that the channel is idle (e.g., not in use by the AP 200 or any other device). For example, the AP 200 may determine that in a given 100 ms time period, the given scanned channel is idle for 20 ms. Therefore, the available airtime based on such measurement is 20%. However, since one CCA measurement may not provide an accurate measurement of the available airtime, the AP 200 may repeat the CCA measurement multiple times and set the available airtime as an average of the CCA measurements. For example, the AP 200 may perform 5 CCA measurements and set the available airtime of the scanned channel as the average of the 5 CCA measurements.

The AA information may or may not be available. In at least one example embodiment, when the AA information is not available, the method based on which the AP 200 selects a frequency channel to operate on, may be referred to as the IACS without AA, which will be further described below.

In at least one example embodiment, the AP 200 obtains the second type of information by executing a code, stored in the storage element 205, which when executed, implements Algorithm 1, as shown below. As shown in Algorithm 1, in at least one example embodiment, the AP 300 repeats the measurement of AA until such measurement converges to an estimation that satisfies a minimum standard deviation among the CCA messages. The minimum standard deviation may be a matter of design choice and thus is determined based on empirical studies. The minimum standard deviation represents a confidence value in the accuracy of the measured AA. If a reliable AA estimation cannot be obtained with a specific number of measurements (e.g. $A_{min}$, as shown in Algorithm 1), the AA is set as the minimum of the measured AAs (e.g., the least available AA).

---

Algorithm 1
Algorithm 1: Estimated Available Airtime, $\tau(c)$

---

C : List of channels in the channel plan;
C : Number of channels in the channel plan, C = |C|;
/* $\tau(c)$ denotes the estimated available airtime for channel c*/
/* $\bar{a}(c)$ denotes the average available airtime over sample CCA measurements for channel c*/
/* $\sigma(c)$ denotes the standard deviation of available airtime measurements for channel c*/
/* $A_{min}$ denotes the required minimum number of CCA samples*/
/* $A_{max}$ denotes the maximum allowable number of CCA samples*/
/* $\sigma_0$ denotes the required minimum standard deviation*/
/* F(c) is a flag denoting that airtime scan is complete for channel c*/
for j ← 1 to $A_{max}$ do
    for c ← 1 to C do
        if !F(c) then
            a(c,j) ← Get a CCA measurement for channel c;
            $\bar{a}(c) = 1/j \sum_{k=1}^{j} a(k)$;
            $\sigma^2(c) = 1/j \sum_{k=1}^{j} (a(c,k) - \bar{a}(c))^2$;
            if $\sigma(c) < \sigma_0$ and $A_{min} < j$ then
                $\tau(c) \leftarrow \bar{a}(c)$;
                F(c) = True;
            if $\sigma(c) > \sigma_0$ and $A_{max} < j$ then
                $\tau(c) \leftarrow \min_{k=1,\ldots,j} a(c, k)$;
                F(c) = True;

---

In at least one example embodiment, the AP 200 may determine the maximum of the measured AAs for each channel as the AA for that channel. In at least one example embodiment, the AP 200 may determine the minimum of the measured AAs for each channel as the AA for that channel. In at least one example embodiment, the constraint on the minimum standard deviation is relaxed such that the measured AAs for each channel converges to the estimation more rapidly.

Based on the first type of information and the second type of information, the AP 200 creates Table 1 shown below. Table 1 is the RILT, mentioned above. As can be seen from Table 1, RILT includes several channel numbers. Depending on the frequency band in which the AP 200 operates, the number of channels may be different. For example, the 5 GHz band has more channels than the 2.4 GHz band. The example embodiment shown in Table 1 illustrates channels with 40 MHz bandwidth, namely, 36, 44, 52 ... 132, in the 5 GHz band. A scan carried out in a specific channel provides information, such as available airtime and received interference level information, for all the channel numbers within the occupied bandwidth. For example, channels 38, 40 and 42 are available between the $36^{th}$ and the $44^{th}$ channels however, assuming a 40 MHz bandwidth for each channels, $40^{th}$ and $42^{nd}$ channels have bandwidths that overlap with the $36^{th}$ and the $44^{th}$ channels.

While selecting channels with non-overlapping frequency bandwidths are preferable, in at least one example embodiment, channels with overlapping frequencies are scanned by the AP 200. In one example embodiment and in reference to the determination of the AA for each channel, if the AP 200 is unable to obtain a convergence of the measured AAs to the set estimation in a given period of time (e.g., one millisecond, one second, etc.), then the AP 200 will scan overlapping channels. For example, after scanning channel 36 and determine a first AA for channel 36, if the AP 200 is unable to find a convergence of the measured AAs for the non-overlapping channel 44, within a given period of time, then the AP 200 scans the overlapping channel 40 instead.

At each scanned channel, Table 1 illustrates an interference level. In at least one example embodiment, when the AP 200 actively scans each channel, the AP 200 detects one or more other APs. If the AP 200 detects more than one other AP, then the AP 200 selects one of the other APs with the strongest interference level (IL) to be included in table 1. For example, if at channel 36, the AP 200 detects three other APs with ILs of −55 dBm, −67 dBm and −70 dBm, the AP 200 selects the AP with the −55 dBm IL to be included in Table 1 for channel 36.

Table I also includes an available airtime (AA) if information on the AA are available. The AA is expressed in terms of percentages, for each channel, which the AP 200 determines, as described above. While the Table 1 is initially created when the AP 200 is turned on, in at least one example embodiment, the AP 200 periodically updates the Table 1 at, for example, times when there is no traffic on the AP 200. The periodicity of updating the Table 1 may be for example, every 30 minutes. The periodicity with which Table 1 is updated will be further described with reference to FIG. 3.

TABLE I

| | Channel | | | | | | | |
|---|---|---|---|---|---|---|---|---|
| | 36 | 44 | 52 | 60 | 100 | 108 | 116 | 124 | 132 |
| Interference Level (dBm) | −55 | −65 | −75 | −90 | −75 | −65 | −55 | −90 | −90 |
| AA (%) | 20 | 50 | 50 | 100 | 100 | 20 | 50 | 100 | 100 |

Depending on standards set by the industry, which may be different in different countries (e.g., Europe v. the United States), in a given frequency band, certain channels may be used to transmit radar signals by radar systems. Radar signals may refer to signals transmitted by law enforcement units (e.g., police), signals transmitted by air control units at airports, etc. As an example, the 5 GHz frequency band is utilized for transmission of radar signals, where channels such as channels 108, 116, 124, 132, etc., can be used for radar transmission as well as transmission by AP devices.

In at least one example embodiment, in determining the example RILT table discussed above, the AP 200 also determines if each of the channels it listens also have radar signal(s) transmitted thereon. The AP 200 determines the existence of such radar signal(s) according to, for example, the method described in the U.S. application Ser. No. 13/558,170, incorporated herein by reference in its entirety.

If the AP 200 determines that any of the channels monitored/listened to by the AP 200 have radar signals transmitted thereon, then the AP 200 eliminates such channels from the RILT table. For example, at the boot up or during any updating of the RILT table, if the AP 200 determines that channel 132 is used by a radar system to transmit radar signals, then the AP 200 excludes the channel 132 from the created/updated RILT table.

In operation S310, using the RILT, an example embodiment of which is described above and a TILT, which will be described below, the AP 200 determines the effective NF for each available/scanned channel, for example, for each of the channels 36, 44, 52 . . . 132, shown in Table 1. The TILT is described below.

The AP 200 competes with other APs in its vicinity for utilizing the same channel. However, if the neighboring APs are operating on a different frequency channel (e.g., adjacent channels), signals received from the neighboring APs appear as ACI signals to the AP 200, causing the effective NF of the channel at which the AP 200 operates to increase. Depending on how close the neighboring APs are to the AP 200 and/or how strong the power of interfering signals received from the neighboring APs are, the ACI from the neighboring APs may increase the effective NF of the channel at which the AP 200 operates to such extend that the AP 200 may only be able to communicate with its clients according to the lowest modulation and coding scheme (MCS) or in some cases may not be able to communicate with its clients. In other words, the ACI signals negatively impacts the receive sensitivity of the AP 200.

Accordingly, the TILT is determined for the AP 200. The TILT quantifies the effect of ACI (at different interference levels) on the receive sensitivity of the AP 200. In other words, TILT provides the effective NF of the AP 200, when AP 200 operates at channel $c_i$, and an interfering signal with a given IL or within a given IL range is received from another AP at channel $c_j$, where i is different from j. In at least one example embodiment, the TILT is based on laboratory measurements and is to be determined as follows.

During the laboratory measurement, two APs are connected to each other in a conducted antenna test setup. One of the two APs is tuned to one channel frequency (e.g., receiving AP) while the other one of the two APs (e.g., interfering AP) is tuned to each of the remaining channel frequencies, one at a time. At each of the remaining channel frequencies, while the interfering AP sends packets to the receiving AP at varying ILs, for each MCS level, the receive sensitivity of the receiving AP is measured and tabulated. The receive sensitivity of the receiving AP may also be referred to as a required minimum signal strength (RMSS) of the receiving AP. In at least one example embodiment, the results of the measurements are tabulated as shown in Table II. In the given example, it is assumed that the receiving AP uses 40 MHz bandwidth. In other embodiments, depending on the used protocol, such as but not limited to, IEEE 802.11a/b/g/n/ac, the AP may employ 20 MHz, 80 MHz and 160 MHz bandwidths as well, in such embodiments Table II should be generated accordingly.

TABLE II

| Operating Channel | Interfering Channel | Interference Level (dBm) | Required Minimum Signal Strength for MCS7 (dBm) |
|---|---|---|---|
| 36 | 44 | −40 ≤ IL | −45 |
| | | −50 ≤ IL < −40 | −50 |
| | | −60 ≤ IL < −50 | −60 |
| | | −70 ≤ IL < −60 | −66 |
| | | IL < −70 | −70 |
| | 52 | −40 ≤ IL | −40 |
| | | −50 ≤ IL < −40 | −48 |
| | | −60 ≤ IL < −50 | −50 |

TABLE II-continued

| Operating Channel | Interfering Channel | Interference Level (dBm) | Required Minimum Signal Strength for MCS7 (dBm) |
|---|---|---|---|
| | | $-70 \leq IL < -60$ | $-56$ |
| | | $IL < -70$ | $-70$ |
| ... | ... | ... | ... |
| | 132 | $-40 \leq IL$ | $-60$ |
| | | $-50 \leq IL < -40$ | $-70$ |
| | | $-60 \leq IL < -50$ | $-70$ |
| | | $-70 \leq IL < -60$ | $-70$ |
| | | $IL < -70$ | $-70$ |
| ... | ... | ... | ... |
| 132 | 36 | $-40 \leq IL$ | $-45$ |
| | | $-50 \leq IL < -40$ | $-50$ |
| | | $-60 \leq IL < -50$ | $-60$ |
| | | $-70 \leq IL < -60$ | $-66$ |
| | | $IL < -70$ | $-70$ |
| | 44 | $-40 \leq IL$ | $-40$ |
| | | $-50 \leq IL < -40$ | $-48$ |
| | | $-60 \leq IL < -50$ | $-50$ |
| | | $-70 \leq IL < -60$ | $-56$ |
| | | $IL < -70$ | $-70$ |
| ... | ... | ... | ... |
| | 124 | $-40 \leq IL$ | $-60$ |
| | | $-50 \leq IL < -40$ | $-70$ |
| | | $-60 \leq IL < -50$ | $-70$ |
| | | $-70 \leq IL < -60$ | $-70$ |
| | | $IL < -70$ | $-70$ |

In at least one example embodiment, Table II may provide the following information. Assuming a MCS level of 7 symbols, which will be described below, an AP at channel 36, that receives an interfering signal from channel 44 with an interference level of $-45$ dBm, has a RMSS of $-50$ dBm. This may be denoted by RMSS (35, 44, $-45$, 7)=$-50$ dBm. Using the measured receive sensitivity of the other AP and the minimum signal to interference and noise ratio (SINR) required to decode a symbol at one of the MCS levels, an effective NF of the other AP at each channel is determined.

Table III provides an example embodiment, of how a SINR is determined for each MCS level. Table III provides several MCS, at each of which a data packet with a given Quadrature Amplitude Module (QAM) and a given coding rate can be successfully decoded if the SINR is the corresponding SINR. For example, according to MCS 7, a packet with a 64-QAM and a 5/6 rate can be decoded successfully if the SINR is 32 dB. The example embodiment of Table III is an IEEE 802.11 standard.

TABLE III

| MCS | Modulation | Coding rate | SINR |
|---|---|---|---|
| 0 | BPSK | ½ | 1 |
| 1 | QPSK | ½ | 1 |
| 2 | QPSK | ¾ | 1 |
| 3 | 16-QAM | ½ | 2 |
| 4 | 16-QAM | ¾ | 2 |
| 5 | 64-QAM | ⅔ | 3 |
| 6 | 64-QAM | ¾ | 3 |
| 7 | 64-QAM | ⅚ | 3 |
| | | | 2 |

Thereafter, in at least one example embodiment, the effective NF is determined based on the measured receive sensitivity (e.g., using Table II above) and the SINR provided in Table III. In at least one example embodiment, the effective NF is determined as follows.

$$NF(c_i, c_j, IL) = RS(c_i, c_j, IL, m) - SINR(m) \qquad (1)$$

where NF ($c_i$, $c_j$, IL) is the effective NF of AP 200, when AP 200 operates on channel frequency $c_i$, with an interference received from another AP at channel $c_j$ with an interference level IL, RS ($c_i$, $c_j$, IL, m) is the received sensitivity of the AP 200 to decode m MCS symbols at channel frequency $c_i$, with an interference received from another AP at channel $c_j$ with an interference level IL (e.g., RMSS of the AP 200) and SINR (m) is the signal to interference and noise ratio for the m MCS symbols. In at least one example embodiment, while the RMSS and the SINR of the AP 200 for each m MCS symbols may be different, the difference between the RMSS and the SINR for different m MCS symbols is constant.

In at least one example embodiment, the determined effective NF for a given MCS symbol is tabulated. Table IV illustrates an example embodiment of a TILT, which provides the effective NFs of the AP 200, when operating on channel frequency $c_i$, with an interference received from another AP at channel $c_j$ with varying interference levels IL.

In at least one example embodiment, when multiple ACI signals from multiple interfering channels are received at the AP 200 operating at channel $c_i$, the effective NF is the highest NF among the NFs determined for each interfering channel.

TABLE IV

| Operating Channel | Interfering Channel | Interference Level (dBm) | Noise Floor (dBm) |
|---|---|---|---|
| i | j | $-40 \leq IL$ | $NF_1(i,j)$ |
| | | $-50 \leq IL < -40$ | $NF_2(i,j)$ |
| | | $-60 \leq IL < -50$ | $NF_3(i,j)$ |
| | | $-70 \leq IL < -60$ | $NF_4(i,j)$ |
| | | $IL < -70$ | $NF_5(i,j)$ |

Table II, Table III and Table IV, are stored in the storage element 205 of the AP 200 and used by the IACS code, when the IACS is executed by the processor 203 to perform the functions described above. In at least one example embodiment, Table I is stored in the memory 204, as the processor periodically needs to access the RILT to determine the effective NF for each channel. In at least one example embodiment, Table II is also stored in the memory 204 for similar reasons as Table I.

In operation S315, the AP 200 determines whether any clients (e.g., one or more UEs) are connected to AP 200 and thus measures the signal power of a signal received from any connected client. The AP 200 keeps signal strength information of clients connected to the AP 200. In at least one example embodiment, the information related to clients connected to the AP 200 are tabulated and stored in a table, as shown in Table V, below. As can be seen from Table V, the AP 200 stores information related to MAC address of any client connected to the AP 200 along with the updated signal strength of the connected client as well as the channel on which the client communicates with the AP 200. In order to maintain connectivity with all of its clients, the receive sensitivity of the AP 200 should be higher than the minimum signal strength of all the clients connected to the AP 200 at any given time. In at least one example embodiment, Table V is stored in the storage element 205 of the AP 200.

TABLE V

| MAC | Channel | RSS (dBm) |
|---|---|---|
| 18:28:61:24:08:7C | 132 | −76 |
| 18:28:61:24:08:AB | 132 | −65 |
| 18:28:61:16:78:1A | 132 | −50 |

If at operation S315, the AP 200 determines that no client is connected to AP 200, then at operation S320, the AP 200 determines the channel with the lowest effective NF to operate on. The AP 200 determines the channel with the lowest effective NF, based on the RILT and TILT, an example of which is described above.

However, if at operation S315, the AP 200 determines that one or more clients are connected to the AP 200, then at operation S325, the AP 200 determines the achievable throughput for each channel, which may also be referred to as achievable physical data rate. The AP 200 determines the achievable throughput, hereinafter referred to as throughput, as follows.

Let $m_{ik}(\gamma_{ik}(c_i))$ denote the maximum MCS level that can be supported with an SINR level of $\gamma_{ik}(c_i)$, which is a SINR of a signal transmitted from client k observed by the $AP_i$ (e.g., AP 200) at channel Q. In at least one example embodiment, $\gamma_{ik}(c_i)$ is determined based on the following equation:

$$\gamma_{ik}(c_i) = \frac{P_k(c_i)}{N_0 + \sum_{\substack{j=1 \\ i \neq j}}^{N} \rho(P_{ij}(c_j), c_i)} \quad (2)$$

$P_{ik}(c_i)$ is the average transmit power with which a packet transmitted by from node k is received at the AP 200, at the channel $c_i$. $P_{ik}(c_i) = P_k \sigma^2_{h/k}$, where $P_k$ is the average transmit power of an AP at node k and $\sigma^2_{h/k}$ is the mean channel gain (e.g., $E\{|h_i|^2\} = \sigma^2_{h/i}$), where E is the expected value. Furthermore, $\rho(P_{ij}(c_j), c_i)$ is the average power level of a signal transmitted from $AP_j$ at channel $c_j$ and received by $AP_i$ at channel $c_i$. $N_0$ is an expected value of additive white Gaussian noise at all channels. In at least one example embodiment, $N_0$ is approximated as $N_0 = kTB$, where k is the Boltzmann constant, T is the temperature of the receiver and B is the signal bandwidth.

In at least one example embodiment, when determining $\gamma_{ik}(c_i)$, the AP 200 takes into account the different maximum equivalent isotropic radiated power (EIRP) regulations through the band of operation. For example, according to the European Standards, in a 5 GHz band, the maximum transmission power for an AP to communicate with its client on a low band channel (e.g., one of channels 36-64), is 23 dBm. Similarly, in the 5 GHz band, the maximum transmission power for the AP to communicate with its client on a high band channel (e.g., one of channels 100 and above), is 30 dBm. As such, the AP preferably avoids switching to a low power level channel from a high power level channel, when the AP-client connection is weak. In at least one example embodiment, $P_k$ is constrained with the maximum available transmit power budget, depending on the channel on which the AP 200 operates.

While the transmission powers in the low band and high band may be different according to the U.S. standards, the same concept of considering the maximum transmission power applies, when the AP 200 determines $\gamma_{ik}(c_i)$.

In at least one example embodiment, the maximum MCS level that is supported with an SINR level of $\gamma_{ik}(o)$, determined using equation (2), is determined based on Table III. For example, if the determined SINR level is 32 dB, then referring to Table III, the maximum MCS level that is supported is 7 MCS symbols.

Thereafter, the AP 200 determines a physical data rate between node i and node k (where the AP 200 may be at either one of the nodes (e.g., clients) i and k) that is achievable at channel $c_i$. This physical data rate may be denoted by $r_{ik}(c_i)$, and in at least one example embodiment, is given as:

$$r_{ik}(c_i) = g(m_{ik}(\gamma_{ik}(c_i)), S) \cdot \tau(c_i) \quad (3)$$

where S is set of system specific parameters including a channel's guard interval (GI), the channel's bandwidth and the number of antennas at the transmitter and receiver sides. The function g outputs a physical data rate at channel $c_i$ based on the maximum MCS level and the set of parameters S.

In one example embodiment, the form of function g may be based on laboratory measurements. For example, during laboratory trials and studies, the behavior of the physical data rate as a function of S and/or the maximum MCS level is determined, tabulated and/or visualized.

FIGS. 4A-B illustrate the achievable physical data rate with respect to the MCS level for a given number of antennas at the transmitter and the receiver sides, according to example embodiments. In at least one example embodiment shown in FIG. 4A, the number of antennas at the transmitter and receiver sides is two (e.g., the variable S is 2). Given that S is 2, FIG. 4A illustrates how the physical data rate (UDP throughput of the AP 200 at a channel $c_i$ changes as function of the maximum MCS levels. Moreover, the dashed line represents an example in which the bandwidth of each frequency channel is 20 MHz, while the solid line represents an example in which the bandwidth of each frequency channel is 40 MHz.

In at least one example embodiment shown in FIG. 4B, the number of antennas at the transmitter and receiver sides is four (e.g., the variable S is 4). Given that S is 4, FIG. 4B illustrates how the physical data rate (UDP throughput of the AP 200 at a channel $c_i$ changes as function of the maximum MCS levels. Moreover, the dashed line represents an example in which the bandwidth of each frequency channel is 20 MHz, while the solid line represents an example in which the bandwidth of each frequency channel is 40 MHz.

Referring back to FIG. 3 and equation (3), in at least one example embodiment, the AP 200, having determined the physical data rate (e.g., function g of equation (3)), multiplies the resulting physical data rate by the available airtime, provided in Table I discussed above, to determine $r_{ik}(c_i)$, which is the achievable physical data rate for channel $c_i$.

As indicated above, the AA information may or may not be available. In at least one example embodiment in which the AA information is not available (which as mentioned above may be referred to as IACS without AA), the achievable physical data rate is simply determined as follows:

$$r_{ik}(c_i) = g(m_{ik}(\gamma_{ik}(c_i)), S) \quad (4)$$

Thereafter, at operation S330, the AP 200 determines a frequency channel to operate on. The determined frequency channel has the maximum physical data rate between the AP 200 and a client connected to AP 200, which has the lower SINR among all clients connected to the AP 200. In other words, the AP 200 finds/selects a channel that maximizes $r_{ik}(c_i)$ among all clients connected to AP 200.

In at least one example embodiment, the AP 200 may have stored there a computer code, which when executed by the processor 203, implements Algorithm II, shown below. Algorithm II may be referred to as the Interference Aware Channel Selection algorithm, corresponding to operations performs at S315-S330.

---

Algorithm II
Algorithm 2: Interference Aware Channel Selection

```
S : Sorted list of channels in RILT;
S ← |S|;
/*S(1) is the channel that encounters the lowest interference level*/
/*S(S) is the channel that encounters the highest interference level*/
Compute r(c) Ser end S(c), where c = 1,..., S;
for i ← 1 to S do
    /*R denotes the estimated rate rector and R(i) represents i^th
    element of this vector,*/
    /*NF denotes the estimated NF and NF(i) represents i^th element
    of this vector,*/
    for j ← 1 to S do
        if S(i) ≠ S(j) then
            NF(i) ← Compute NF using (4);
            if client connected then
                R(i) ← Compute achievable physical rate for the client
                with the minimum signal strength using (2);
    R_m(i) ← min(R);
    NF_m(i) ← max(NF);
if client connected then
    R_m* ← max R_m; /*Maximum achievable PHY rate*/
    c* ← arg max R_m; /*Best channel*/
else
    NF_m* ← min NF_m; /*Minimum achievable NF*/
    c* ← arg min NF_m; /*Best channel*/
```

---

In at least one example embodiment, if the AP 200 determines that two or more channels equally provide the best data throughput in the presence of one or more clients connected to the AP 200, or the same lowest NF in the case of no client being connected to the AP 200, the AP 200 selected the channel with the lowest frequency to operate on.

In at least one example embodiment, the AP 200 selects not only the channel with best data throughput, the AP 200 also prioritizes channels in a descending order with respect to their data throughput. In at least one example embodiment, the AP 200 may create a list of the prioritized frequency channels.

Referring back to the example embodiment, in which the AP 200 considers the existence of radar signals transmitted by radar systems, in at least one example embodiment, the AP 200, upon selecting a channel with the best data throughput, periodically determines whether a radar signal is transmitted on the selected channel or not (e.g., every 1 minute, 5 minutes, etc.). If the AP 200 determines that a radar signal is being transmitted on the selected channel, the AP 200 switches to the next best channel from the list of prioritized frequency channels described above. As mentioned above, in at least one example embodiment, the AP 200 utilizes the radar detection method described in the U.S. application Ser. No. 13,558,170, incorporated herein by reference in its entirety.

Furthermore, in at least one example embodiment, the AP 200 utilizes the radar avoidance method described in the U.S. application Ser. No. 13,558,170, incorporated herein by reference in its entirety.

At operation S335, the AP 200 starts a timer, based on which the AP 200 determines whether to reiterate the functions performed at operations S305-S330. In at least one example embodiment, such reiteration is for the purpose of rescanning the channels, updating the RILT table and finding an appropriate channel to operate on, since the best channel with the maximum throughput at one instance of time may not be the same as the best channel with the maximum through at another instance of time.

At operation S340, the AP 200 determines whether the timer is OFF. If at operation S340, the AP 200 determines that the timer is OFF, then the process reverts back to operation S305 and the AP 200 repeats S305-S340. However, if at operation S340, the AP 200 determines that the timer is still ON, then AP 200 repeats S340 until the AP 200 determines that the timer is OFF.

In at least one example embodiment, the AP 200 is a mesh node that is part of a mesh network. In a mesh network, different APs communicate with one another. For example, each AP is configured to form, either automatically or manually, a mesh network with other APs in its vicinity. At the same time, each different AP may receive different interference signals in its vicinity. If each AP performs IACS process, as described above, then different APs may determine different channels as channels having the maximum throughput, as discussed above.

FIG. 5 illustrates two mesh networks transmitting in the vicinity of each other, according an example embodiment. As shown in FIG. 4, mesh network A is in the vicinity of mesh network B. Furthermore, mesh network A has APs $A_1$ and $A_2$ as well as client $C_A$. Mesh network B has APs $B_1$ and $B_2$ with client $C_B$. In the example of FIG. 5, while AP $A_1$ and AP $B_1$ receive interfering signals from one another, $A_2$ is unaware of any interference signal from $B_1$. Similarly, $B_2$ is unaware of any interfering signal from $A_2$, which may result in $A_2$ determining a different frequency channel to operate on as compared to $A_1$ and similarly $B_2$ selecting a different frequency channel from $B_1$ to operate on.

To address the discrepancy that may result from selecting different channels to operate on, when the AP 200 is a node of a mesh network, the RILTs of all nodes in a mesh network are synchronized. FIG. 6 illustrates a flow chart for performing an Interference Aware Channel Selection process in a mesh network, according to an example embodiment.

At operation S600, the AP 200 is turned on. At operation S605, the AP 200, scans available channels in a frequency band. The operation at S605 is the same as the operation at S305, described above with respect to FIG. 3.

At operation S610, the AP 200 determines whether the AP 200 is part of a mesh network (i.e., AP 200 is not a mesh node). If at operation S610, the AP 200 determines that the AP 200 is not a mesh node, then at operation S615, the AP 200 performs the operations S310-S340, as described above with reference to FIG. 3.

However, if at operation S610, the AP 200 determines that the AP 200 is a mesh node, then at S620, the AP 200 establishes communication with other AP(s) of the mesh network to which the AP 200 belongs.

In at least one example embodiment, the determination by the AP 200 as to whether the AP 200 is part of a mesh network and/or the establishing of communication with other AP(s) of such mesh network is based on methods/procedures described in U.S. application Ser. No. 14/166,040, incorporated herein by reference, in its entirety.

Thereafter, at operation S625, the AP 200 exchanges its RILT table with other mesh nodes of the mesh network to which the AP 200 belongs. At operation S630, the AP 200 updates its RILT based on the exchange of RILT tables at S625. In at least one example embodiment, after the updating RILT table of each mesh node of the mesh network is the same.

In at least one example embodiment, the RILT of AP 200 is the Table I, described above. Furthermore, an RILT of another mesh node (e.g., Node B) of the mesh network to which the AP 200 belongs is given as shown in Table VI.

TABLE VI

| | Node B | | | | | | | |
|---|---|---|---|---|---|---|---|---|
| | Channel | | | | | | | |
| | 36 | 44 | 52 | 60 | 100 | 108 | 116 | 124 | 132 |
| Interference Level (dBm) | −60 | −70 | −80 | −80 | −70 | −65 | −55 | −80 | −65 |
| AA (%) | 30 | 50 | 60 | 100 | 100 | 30 | 50 | 100 | 50 |

In at least one example embodiment, upon exchanging RILTs, the updated RILT is given as shown below in table VII. As can be seen from Table VII, the updated/synchronized RILT, includes the higher IL level at each channel when comparing the RILTs of different mesh nodes. For example, Table I provides an IL of −55 dBm at channel 36 while Table VI provides an IL of −60 dBm at channel 36. Therefore, the updated/synchronized table includes the higher IL of the two tables I and VI (i.e., the −55 dBm IL of Table I).

TABLE VII

| | Nodes A&B | | | | | | | |
|---|---|---|---|---|---|---|---|---|
| | Channel | | | | | | | |
| | 26 | 44 | 52 | 60 | 100 | 108 | 116 | 124 | 132 |
| Interference Level (dBm) | −55 | −65 | −75 | −80 | −76 | −65 | −55 | −80 | −65 |
| AA (%) | 20 | 50 | 50 | 100 | 100 | 20 | 50 | 0 | 50 |

Thereafter, the process reverts back to operation S615, where the AP 200 repeats operations S310-S340, as described above with reference to FIG. 3.

FIG. 7 illustrates a result of how the effective NF of an access point is impacted by the presence of an adjacent channel interfering signal, according to one example embodiment. In FIG. 7, it is assumed that the interfering signal is at 5220 MHz (which corresponds to channel 44 in the 5 GHz band). Then interfering signals received with different powers (expressed in dBm units) may result in different effective noise levels at other channels. For example, when the interfering signal is received from the 44th channel with a power of −35 dBm, then effective NF at non-overlapping adjacent channel (e.g., channel 36 at 5180 MHz) is −58 dBm. However, if the power of the interfering signal is −40 dBm, then the NF at the adjacent non-overlapping channels 36 is −72 dBm and the NF at the non-overlapping adjacent channel 52 is −60 dBm. Furthermore, FIG. 7 illustrates that the interfering signal not only has an impact on adjacent non-overlapping channels but it may also affect other non-overlapping channels that are not immediately adjacent to the channel from which the interfering signal is received (e.g., at 5500 MHz, 5540 MHz, etc., as shown in FIG. 7).

FIG. 8 illustrates a comparison between the IACS/IACS without AA methods and other available methods, according to one example embodiment. Other available channel selection methods may be referred to as the AP count method and the AA method. According to the AP count method, the channel that is observed to have the least number of APs is selected as the best channel. According to the AA method, the channel with the maximum AA is selected as the best channel.

As shown in FIG. 8, the throughput of an AP (e.g., AP 300) at the best channel selected according to IACS matches the throughput of the AP at the best channel selected according to the AA method, when the signal strength of signals received from the client at the AP is moderate to high (e.g. between −40 dBm to −65 dBm). However at the same signal levels the IACS outperforms the IACS without AA and the AP count method.

FIG. 8 further illustrates that when signal strength of signals received at the AP from its clients, is low (e.g., less than −65 dBm), the IACS method and the IACS without AA method outperform the AA method and the AP count method. In other words, the throughput of the AP at the best channel selected according to the IACS and the IACS without AA methods is significantly better than the throughput of the AP at the best channel selected according to either the AP count method or the AA method.

Although example embodiments have been shown and described, it would be appreciated by those skilled in the art that changes may be made in these embodiments without departing from their principles and spirit, the scope of which is defined in the claims and their equivalents.

Furthermore, while the above described example embodiments relate to a wireless communication system in which an AP wirelessly communicates with a client, the IACS methods described above (e.g., the IACS and the IACS method without AA), applies to any system involving a channel selection process. For example, the IACS may be, modified to correspond to parameters specific to power communication lines and subsequently applied to frequency notching in such power line communication system.

What is claimed is:

1. An access point (AP) configured to determine a frequency channel to operate on, the access point comprising:
a processor; and
a storage element having machine executable code therein that, when executed by the processor, causes the processor to operate on the frequency channel with a highest data throughput among available frequency channels by,
scanning the available frequency channels to determine at least an interference level of each of the available frequency channels, the interference level indicating a level of interference by one of a plurality of interfering signals at a corresponding one of the available frequency channels,
creating a table based on at least the interference level at each of the available frequency channels,
determining, for each of the available frequency channels, a tolerable interference level thereat using a tolerable interference level table (TILT), the tolerable interference level indicating a required minimum signal strength (RMSS) of the AP when the AP is operating on a respective one of the available frequency channels and the respective one of the available frequency channels experiences one of a plurality of interfering signals on an adjacent channel at one of a plurality of different signal strengths,
determining, for each of the available frequency channels, an effective noise floor associated therewith based on the interference level of the respective one of the available frequency channels indicated in the created table and the tolerable interference level at the respective one of the available frequency channels indicated in the TILT, the TILT indicating the effective noise floor for each of the available frequency channels based on tabulated results of measurements of the effect of adjacent channel interference at different signal strengths on a receive sensitivity of the AP, determining an available airtime for each of the available frequency channels, the available airtime indicating an amount of time when a corresponding one of the available frequency channels is idle, and updating, the created table by including the determined available airtime of each of the available frequency channels in the created table.

2. The access point of claim 1, wherein the machine executable code, when executed by the processor, causes the processor to determine whether at least one client is connected to the access point, the at least one client being a device communicating with the access point.

3. The access point of claim 2, wherein if the machine executable code, when executed by the processor, causes the processor to determine that no client is connected to the access point, the machine executable code, when executed by the processor, causes the processor to determine the frequency channel by selecting one of the available frequency channels with the lowest determined effective noise floor among the available frequency channels.

4. The access point of claim 2, wherein if the machine executable code, when executed by the processor, causes the processor to determine that the at least one client is connected to the access point, then the machine executable code, when executed by the processor, causes the processor to determine a signal strength of a signal received from the at least one client at the access point.

5. The access point of claim 4, wherein the machine executable code, when executed by the processor, causes the processor to determine the frequency channel by, determining a data throughput at each of the available frequency channels when the access point communicates with the at least one client over each of the available frequency channels based on the determined signal strength of the signal received at the access point and a set of system parameters; and selecting one of the available frequency channels at which a minimum data throughput when the access point communicates with the at least one client is maximized among the available frequency channels, the minimum data throughput being the data throughput when the access point communicates with the at least one client having a lowest signal to interference and noise ratio (SINR), the selected one of the available frequency channels being the frequency channel with the highest data throughput.

6. The access point of claim 5, wherein the set of system parameters include each of the available frequency channel's guard interval, each of the available frequency channel's frequency bandwidth and a number of antennas of the access point and the at least one client.

7. The access point of claim 1, wherein the machine executable code, when executed by the processor, causes the processor to determine the effective noise floor of each of the available frequency channels based on the updated created table and the TILT indicating the tolerable interference level at each of the available frequency channels, the frequency channel being determined based on at least the created table and the determined effective noise floor of each of the available frequency channels.

8. The access point of claim 7, wherein the machine executable code, when executed by the processor, causes the processor to determine whether at least one client is connected to the access point, the at least one client being a device communicating with the access point.

9. The access point of claim 8, wherein if the machine executable code, when executed by the processor, causes the processor to determine that the at least one client is connected to the access point, then the machine executable code, when executed by the processor, causes the processor to determine a signal strength of a signal received from the at least one client at the access point.

10. The access point of claim 9, wherein the machine executable code, when executed by the processor, causes the processor to determine the frequency channel by, determining a data throughput at each of the available frequency channels when the access point communicates with the at least one client over each of the available frequency channels based on the available airtime of each of the available frequency channels, the determined signal strength of the signal received at the access point and a set of system parameters; and selecting one of the available frequency channels at which a minimum data throughput when the access point communicates with the at least one client is maximized among the available frequency channels, the minimum data throughput being the data throughput when the access point communicates with the at least one client having a lowest signal to interference and noise ratio (SINR), the selected one of the available frequency channels being the frequency channel with the highest data throughput.

11. The access point of claim 10, wherein the set of system parameters include each of the available frequency channel's guard interval, each of the available frequency channel's frequency bandwidth and a number of antennas of the access point and the at least one client.

12. The access point of claim 1, wherein the machine executable code, when executed by the processor, causes the processor to determine whether the access point is a mesh node.

13. The access point of claim 12, wherein upon the machine executable code, when executed by the processor, causes the processor to determine that the access node is a mesh node, the machine executable code, when executed by the processor, causes the processor to, exchange the created table with other mesh nodes; and synchronize the created tables among the mesh nodes.

14. The access point of claim 1, wherein the access point is a router.

15. The access point of claim 1, wherein the access point is configured to, periodically determine whether a radar signal is transmitted on the frequency channel with the highest data throughput, and switch and operate on a next best frequency channel from a list of prioritized frequency channels, if the access point determines that the radar signal is transmitted on the frequency channel with the highest data throughput, the next best frequency channel being a frequency channel with a second highest data throughput; the list of prioritized frequency channels being a list of frequency channels organized in descending order of their respective data throughput.

* * * * *